(12) United States Patent
Dykstra-Erickson et al.

(10) Patent No.: US 9,348,988 B2
(45) Date of Patent: May 24, 2016

(54) BIOMETRIC AUTHORIZATION FOR REAL TIME ACCESS CONTROL

(71) Applicant: Nuance Communications, Inc., Burlington, MA (US)

(72) Inventors: Elizabeth Ann Dykstra-Erickson, San Francisco, CA (US); Susan Dawnstarr Daniel, Palo Alto, CA (US); David Andrew Mauro, Montréal (CA)

(73) Assignee: Nuance Communications, Inc., Burlington, MA (US)

( * ) Notice: Subject to any disclaimer, the term of this patent is extended or adjusted under 35 U.S.C. 154(b) by 105 days.

(21) Appl. No.: 13/787,774

(22) Filed: Mar. 6, 2013

(65) Prior Publication Data

US 2014/0259126 A1    Sep. 11, 2014

(51) Int. Cl.
*G06F 7/04*     (2006.01)
*G06F 21/32*    (2013.01)

(52) U.S. Cl.
CPC .................. *G06F 21/32* (2013.01)

(58) Field of Classification Search
CPC ............................ H04L 63/08; H04L 63/083
USPC .............................................. 726/4–6, 18–19
See application file for complete search history.

(56) References Cited

U.S. PATENT DOCUMENTS

| | | | |
|---|---|---|---|
| 2008/0104006 A1* | 5/2008 | Kiefer | 706/48 |
| 2010/0132043 A1* | 5/2010 | Bjorn et al. | 726/25 |
| 2011/0196784 A1* | 8/2011 | Newman et al. | 705/39 |
| 2012/0296786 A1* | 11/2012 | Shenkar et al. | 705/35 |

\* cited by examiner

*Primary Examiner* — Anthony Brown
(74) *Attorney, Agent, or Firm* — Banner & Witcoff, Ltd.

(57) ABSTRACT

A method of providing biometric authorization comprising enabling a user to log into an account, and determining whether there is a hold on the account. When there is a hold on the account, informing the user of the hold, and enabling the user to respond to a transaction that caused the hold. The method, in one embodiment further comprising prompting the user to enter a biometric authentication, in conjunction with the response, and processing the unblock request in real-time upon receiving and validating the biometric authentication.

20 Claims, 22 Drawing Sheets

Input Formats
- Voice Input
- Text Input
- Touch Input
- Movement Input

Output Formats
- Speech Output
- Non-speech sound Output
- Text Output
- Non-Text Visual Output
- Haptic Output

Fig. 5A

<ANCHOR#A>

The relevant passage

"Lorem ipsum dolor sit amet, consectetur adipisicing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum."

Section 1.10.32

"Sed ut perspiciatis unde omnis iste natus error sit voluptatem accusantium doloremque laudantium, totam rem aperiam, eaque ipsa quae ab illo inventore veritatis et quasi architecto beatae vitae dicta sunt explicabo. Nemo enim ipsam voluptatem quia voluptas sit aspernatur aut odit aut fugit, sed quia consequuntur magni dolores eos qui ratione voluptatem sequi nesciunt. Neque porro quisquam est, qui dolorem ipsum quia dolor sit amet, consectetur, adipisci velit, sed quia non numquam eius modi tempora incidunt ut labore et dolore magnam aliquam quaerat voluptatem. Ut enim ad minima veniam, quis nostrum exercitationem ullam corporis suscipit laboriosam, nisi ut aliquid ex ea commodi consequatur? Quis autem vel eum iure reprehenderit qui in ea voluptate velit esse quam nihil molestiae consequatur, vel illum qui dolorem eum fugiat quo voluptas nulla pariatur?"

Section 1.10.33 <ANCHOR#B>

"At vero eos et accusamus et iusto odio dignissimos ducimus qui blanditiis praesentium voluptatum deleniti atque corrupti quos dolores et quas molestias excepturi sint occaecati cupiditate non provident, similique sunt in culpa qui officia deserunt mollitia animi, id est laborum et dolorum fuga. <ANCHOR#C>Et harum quidem rerum facilis est et expedita distinctio. Nam libero tempore, cum soluta nobis est eligendi optio cumque nihil impedit quo minus id quod maxime placeat facere possimus, omnis voluptas assumenda est, omnis dolor repellendus. Temporibus autem quibusdam et aut officiis debitis aut rerum necessitatibus saepe eveniet ut et voluptates repudiandae sint et molestiae non recusandae. Itaque earum rerum hic tenetur a sapiente delectus, ut aut reiciendis voluptatibus maiores alias consequatur aut perferendis doloribus asperiores repellat."

Fig. 14

BIOMETRIC AUTHORIZATION FOR REAL TIME ACCESS CONTROL

FIELD

The present application is related to a task assistant, and more particularly to a multimodal task assistant that accepts voice input.

BACKGROUND

There are numerous personal assistants for mobile devices available in the marketplace. Some such personal assistants that accept voice input. Such personal assistants are implemented as an application, available on the device, which is designed to provide data that is available on the device or accessible via a search on a search engine such as GOOGLE™ or BING™ search.

BRIEF DESCRIPTION OF THE FIGURES

The present invention is illustrated by way of example, and not by way of limitation, in the figures of the accompanying drawings and in which like reference numerals refer to similar elements and in which:

FIG. 5A illustrates the various input and output formats, in one embodiment.

FIG. 14 is a diagram of one embodiment of anchor points in a native application.

DETAILED DESCRIPTION

A task assistant with multimodal input is described. A task assistant is associated with a native application, on a computer system, and enables multimodal input and output. The multimodal input, in one embodiment, includes input via one or more of: voice, typed text, touch control, and gross movement control. In one embodiment, the corresponding multimodal output provides data to the user via one or more of speech, text, visual display, and haptic feedback. In this way, the task assistant can assist a user more efficiently. The multimodal input permits the user to attend to one or both of a visual interface channel or an audio interface channel, retaining same intent and content regardless of channel attention.

In one embodiment, the task assistant is available as an option from a particular application, and when activated displays its input and output mechanisms in an overlay over the application's own display. In another embodiment, the task assistant may be in a separate window or menuing system. However, the task assistant is specifically associated with a particular application, in one embodiment, and tied to its data sources and capabilities.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
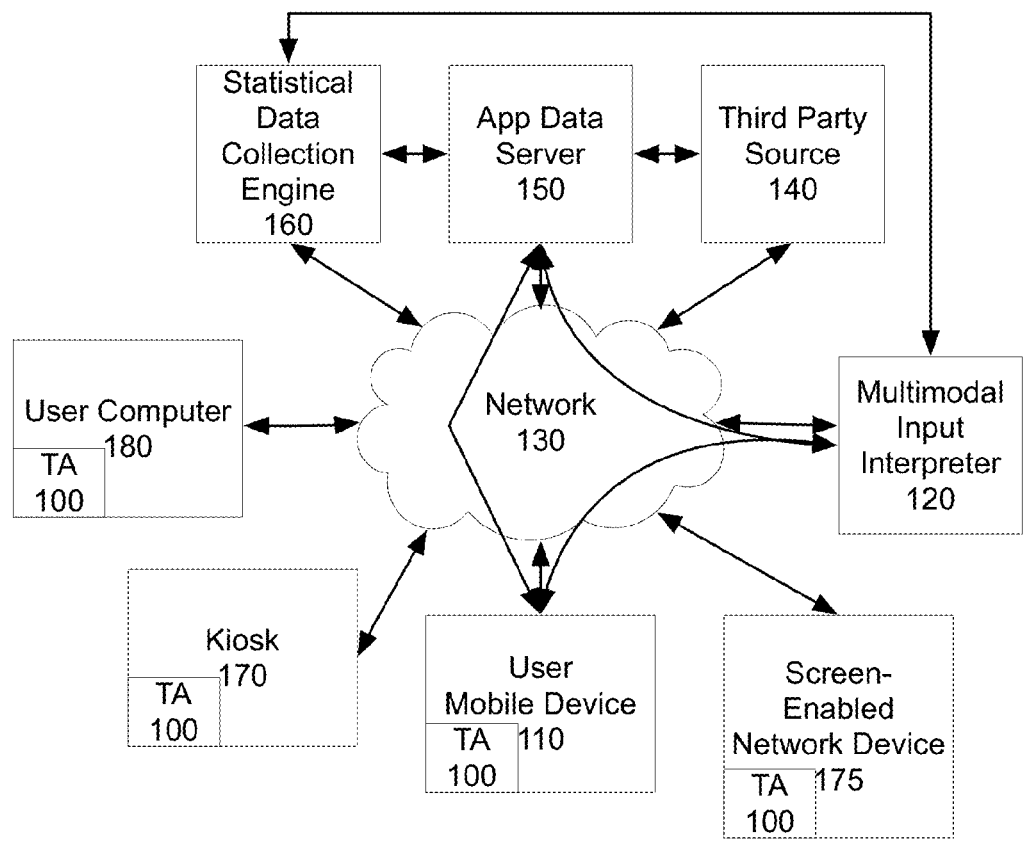
FIG. 1 is a network diagram of one embodiment of a system including a device with a task assistant.

FIG. 1 is a network diagram of one embodiment of a system including a device with a task assistant. The task assistant 100 is shown as residing on one or more of a user mobile device 110, user computer 180, and kiosk 170. The task assistant 100 may also reside on any other device 175 that is capable of user input and output. In one embodiment, the device 175 includes a screen and is network enabled, to enable the device 175 to interact with multimodal input interpreter 120 through the network. However, in another embodiment, the input interpreter may reside on the device 175, enabling the use of the task assistant 100 on any device capable of receiving multimodal input or output 175, ranging from a car, to a television, to a refrigerator. In one embodiment, any device that includes a processor, and a method for at least two modes of output may be considered capable of receiving multi-modal output. In one embodiment, such a device should include a processing mechanism, a screen, and network connectivity.

The present invention will utilize the user mobile device 110 as the device for the purposes of description. However, it should be understood that the task assistant 100 may reside on any type of device that can provide speech input/output and visual input/output, including televisions, vehicles, and other devices.

The device on which the task assistant 100 is present may be connected to a network 130. The network may be the Internet, connected via a wireless connection, cellular network connection, or another type of connection.

In one embodiment, the task assistant 100 may send data to multimodal input interpreter 120. Multimodal input interpreter 120 may interpret the data/request received by task assistant 100, from the user. In one embodiment, a multimodal input interpreter 120 may be part of the task assistant 100, resident on the user's mobile device 110 or elsewhere. The multimodal input interpreter 120 may pass the data/request to the app data server 150. The application data server 150 may respond to the data/request. In one embodiment, the application data server 150 may obtain relevant information from third party source 140. Third party source may be an external server, or an internal database within the server providing the application data server 150.

In general, the task assistant 100 is associated with a particular application. The application may be a banking application, an investment application, a medical application, etc. In one embodiment, a single user mobile device 110 may include a plurality of applications, each with its own associated task assistant 100. For the below specification, the examples provided will be in the context of a banking application. However, one of skill in the art would understand how to utilize similar features in a non-banking application, ranging from a healthcare application to a navigation application to a gaming application.

The data from the application data server 150, the multimodal input interpreter 120, and/or the task assistant 100 may be provided to the statistical data collection engine 160. The statistical data may be used to review the task assistant, provide improved hints or push navigation, or for other purposes. In one embodiment, in addition to wireless connectivity, the user mobile device 110 or other task assistant enabled device be physical coupled to another device. For example, a user mobile device 110 may be physically connected to a kiosk 170, enabling data sharing between their respective task assistants 100.

Figure 2:
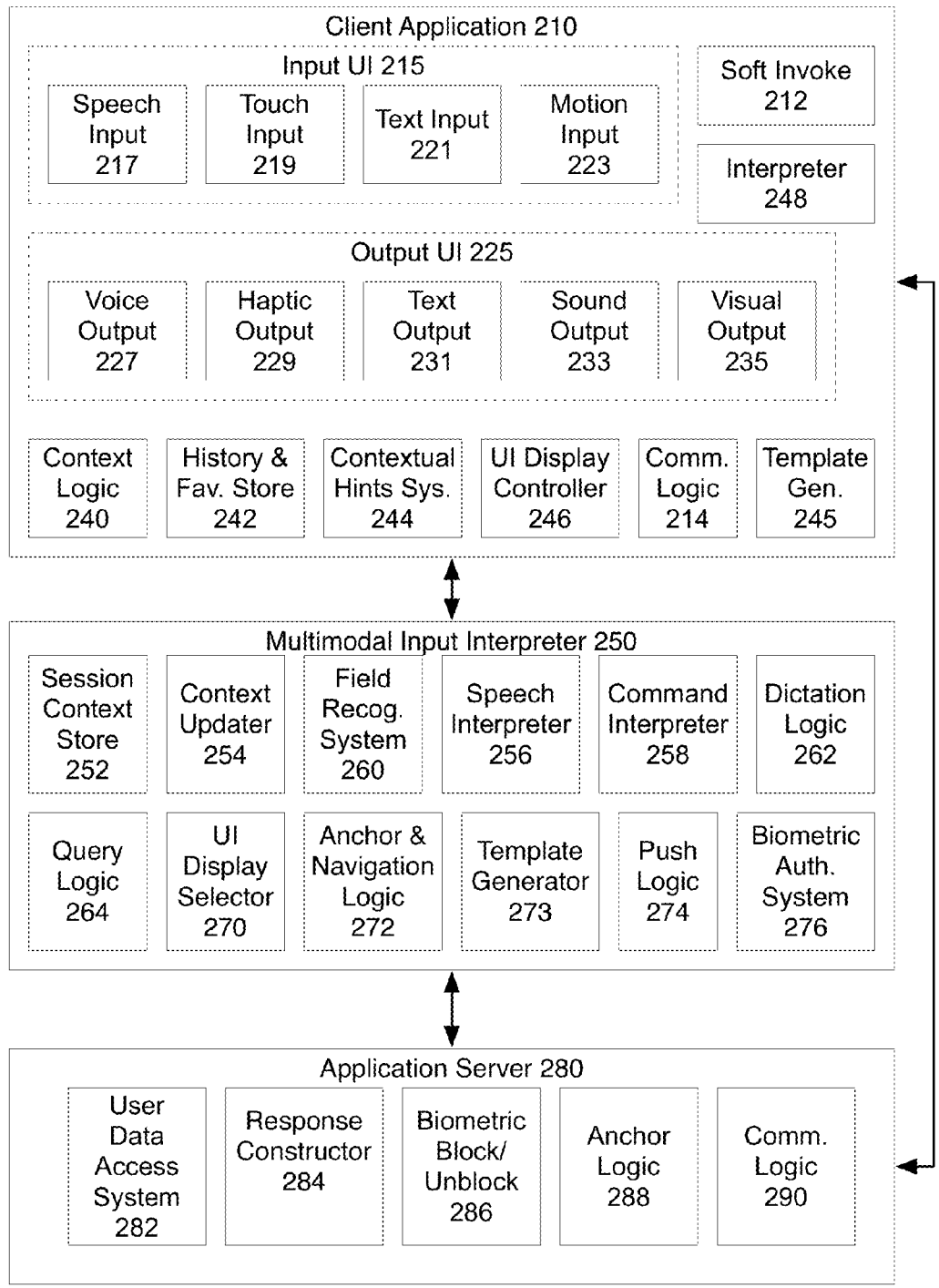
FIG. 2 is a block diagram of one embodiment of a task assistant system.

FIG. 2 is a block diagram of one embodiment of a task assistant system. The system includes elements residing on a client application 210, a multimodal input interpreter 250 and an application server 280. One of skill in the art would understand that though various elements are illustrated as residing in one of those locations, the location of the various software elements may be moved between these locations. In its simplest incarnation, the client application 210 may simply have various modes of input, various modes of output, and a communication mechanism to send the input to an interpreter, and receive the output from the interpreter or another source. In another embodiment, the client application 210 may provide software to interpret the input, and send a processed input to the multimodal input interpreter 250. In another embodiment, the client application 210 may incorporate the multimodal input interpreter 250 into the same device, e.g. a kiosk or similar device. Similarly, the application server 280 may reside on a separate sever, or on the same device as the client application 210 and/or multimodal input interpreter 250. However, for simplicity, the elements shown will be described as being associated with these particular subsets of the task assistant system.

The client application 210 includes a plurality of input UI features 215. Input UI features 215 may include one or more of speech input 217, touch input 219, text input 221, and motion input 223. Other modes of input, now existing or later developed, may also be included in input UI 215. Such modes of input may include, for example, visual input, direct brain interface input, etc. In one embodiment, input UI 215 includes at least two modes of input. In a preferred embodiment, input UI includes at least speech 217, touch 219, and text 221 input.

The client application 210 further includes a plurality of output UI features 225. The output UI features may include one or more of voice output 227, haptic output 229, text output 231, sound output 233, and visual output 235. Sound output 233 is meant to include output that is audio but not speech. For example tones, sounds, etc. would be considered sound output. Visual output 235 is meant to include output that is visual queues but does not include text. For example, icons, animations, color changes, flashing colors, and other such output would be considered visual output.

In one embodiment, client application 210 includes communication logic 214 to communicate with external application elements, such as multimodal input interpreter 250 and application server 280.

In one embodiment, client application 210 further includes soft invoke 212. Soft invoke 212 is an element that enables invocation of the client application 210, without the use of a hardware element. For example, the soft invoke 212 may display a soft button or other invocation mechanism on the user's device, enabling the user to invoke the client application 210. In one embodiment, soft invoke 212 interfaces with an operating system of the user device on which the client application 210 resides, and monitors a touch or other invocation of the client application 210. In one embodiment, soft invoke 212 may also include invocation using a motion pattern, or other mechanism. In one embodiment, when the client application 210 is not active, the soft invoke 212 remains active to monitor the system for invocation of the client application 210.

In one embodiment, client application 210 also includes context logic 240. Context logic 240 maintains a context for a current session of the client application 210. The context is defined by all prior interactions which have not been terminated. The context enables a user to use a truncated command structure to interact with the client application 210, by enabling the system to interpret contextual commands based on the current session of interaction. For example, if a user has successfully made a request in a banking application to show a current monthly statement, a command saying "and the prior one?" would utilize the context of knowing what is currently displayed, and what was previously requested, to display the prior month's monthly statement. In another embodiment, the context logic 240 may reside within multimodal input interpreter 250.

History & favorites store 242 maintains a history of successful queries, made available to the user for simple reuse. In one embodiment, the history is in a reverse chronological order. It also includes the ability for users to mark any successfully executed query as a "favorite" and thus save it in the favorites store. In one embodiment, a successfully executed query displays a result including an icon. The user may select the icon to store the query as a favorite query. This icon may be a star, for example. This again enables simple and speedy reuse. In one embodiment, the favorites may be organized by category. In one embodiment, the favorites may be presented to the user in a manner that takes advantage of the context, provided by context logic 240. In on embodiment, history & favorites store 242 may reside on multimodal input interpreter 250, rather than client application 210.

Contextual hints system 244 utilizes data from context logic 240 to provide useful hints to the user. In one embodiment, the user may invoke the hints/suggestions system, at any point from the client application 210. The hints displayed, however, will vary based on the context from which the user invokes the hints 244. This will be described in more detail below.

UI display controller 246, in one embodiment, enables the client application 210 to provide push navigation. Push navigation may be used when the system needs to present some information to the user. In one embodiment, push navigation may also be used to redirect a user in response to a help request. In one embodiment, push notifications may be invoked when the system determines that the user is in a high stress situation, or a bad mood, and presenting either help or additional information would be useful. In one embodiment, such a high stress situations may be identified based sensing speech patterns, sensing movements indicating stress level, identifying words indicating stress, and interpreting interactions with the system. In one embodiment, in addition to providing push navigation in response to such high stress situations, the system may also provide other feedback, in response.

Push navigation may include a push notification that is presented outside the application itself, using a notification mechanism. These notifications, in one embodiment, may receive an acknowledgement from the user, which navigates the user to an anchor, at which further information is presented, or user input is requested.

Interpreter 248 may interpret the output data provided by application server 280 and/or multimodal input interpreter 250, to convert the data provided to an appropriate output format. In one embodiment, this enables the application server 280 to provide its data in unmodified form, and have the client application 210 provide the interpretation. This enables the use of the task assistant as an overlay on an existing application server providing data in its customary/proprietary format, without altering the underlying application server 280.

Multimodal input interpreter 250 receives data from client application 210. In one embodiment, multimodal interpreter 250 receives raw input data. Speech interpreter 256 interprets speech input. Command interpreter interprets touch input, text input, motion input, as well as the interpreter speech input, and other inputs. Command interpreter 258 uses data from session context store 252, which provides context data, to interpret the meaning of commands.

In one embodiment, whenever a command is successfully interpreted, context updater 254 updates the context so that subsequent commands utilize the up-to-date context information. In one embodiment, the updated context is returned to context logic 240 in client application 210.

In one embodiment, speech input may be commands or dictation. In one embodiment, field recognition system 260 determines whether the speech input interpreted by speech interpreter 256 is a command, to be passed to command interpreter 258 or dictation to be passed to dictation logic 262. This depends on the field associated with the speech input. In one embodiment, fields are tagged, and field recognition system 260 recognizes the tag to determine whether to forward the data to command interpreter 258 or dictation logic 262.

Query logic 264 in one embodiment transforms the command, as determined by command interpreter 258 into the appropriate format for application server 280. This enables queries to be created in natural language, but interact with an application server 280 which can only interpret commands in a certain format. In one embodiment, the language used by the query logic 264 is customized for the application server 280.

UI display selector 270 provides, on one embodiment a response to client application 210 when the command interpreter 258 cannot successfully parse a query/command from client application 210. For example, if the query does not have sufficient context for interpretation, the feedback may be to provide a follow-up question. For another example, if the speech cannot be interpreted due to noise or other factors, the UI display selector 270 may select an appropriate feedback to be output by client application 210. For example, the response may be a tone indicating lack of comprehension. In one embodiment, UI display selector 270 may also provide non-informative feedback, when the query/request is "social" rather than content-based requests. As users interact with their devices, they imbue the devices with a "personality" and attempt to interact with them on a "social" level. For example, a user may ask the Task Assistant "do you like me?" This query need not be passed to application server 280, as no contentful reply is needed. Rather, the UI display selector may select a "social reply" with associated sound or visual outputs. For the query above, the response may be "of course, and I hope you like me too," or something similar.

Anchor and navigation logic 272 enables navigation to various anchor points on pages of data. For example, in a help file, an anchor logic may insert an anchor that allows linking directly to the relevant portion of the help file. Anchor & navigation logic 272 may interact with push logic 274, to push the user to view/consume particular content. For example, if a new version of and End User Agreement is released, push logic 274 may push the user to view & accept the new EULA prior to continuing with other interactions. In one embodiment, push logic 274 interacts with UI display controller 246, to present push notifications, and/or push destinations to the user.

In one embodiment, anchor & navigation logic 272 interacts with template generator 273 to enable the generation of a temporary anchor point to a generated template. This may be useful when the user requests a page that requires data collection, and no such page exists. The template generator 273 generates a temporary template, on the fly, allowing the user to enter the data in connection with the user's query in a single location. In one embodiment, the system may pre-populate the template with the relevant data available from the user's account.

The anchor and navigation logic generates a temporary anchor, so that the system can navigate the user to the temporary template. In one embodiment, by using a temporary template with an anchor, the user can also bookmark the template, enabling him or her to access that data more rapidly in the future. In one embodiment, the template generator 273 may be replaced by, or may work with, template generation logic 245 in client application 210.

Biometric authentication system 276 enables biometric authentication of the user, to access the client application 210, data on application server 280, etc. In one embodiment, biometric authentication system 276 further enables fast unlocking of a locked account, using client application 210. This enables, in one embodiment, validation of particular transactions that would otherwise trigger lock-out from the user's account, or locking down of associated credit cards or other access mechanisms.

In one embodiment, biometric authentication system 276 utilizes a discrimination task to ensure that the biometric data is being entered by the live user, rather than being replayed. Thus, in one embodiment, instead of simply using a voice-print in a password, the user is presented with a discrimination task, using the multimodal features of the task assistant. For example, the user may be asked to say a word displayed on the screen, draw a shape as indicated via speech or text, etc. By requiring a non-recordable action, replay attacks are prevented.

Communication logic (not shown) receives query/input from client application 210, sends the interpreted commands to application server 280, and in some embodiments returns responses to client application 210.

Application server 280 provides the content in responses to the user's queries/requests. The application server 280 includes a communication logic 290, to receive interpreted responses from the multimodal input interpreter 250. In one embodiment, communication logic 290 may provide response data directly to client application 210. In another embodiment, the response data may be provided to multimodal input interpreter 250, which may adjust the response data format, prior to passing it to client application 210.

User data access system 282 retrieves user data, from a local data store, from a remote source, or from multiple local and/or remote sources, in response to the user's query. Response constructor 284 constructs the response. Communication logic 290 sends the response to the multimodal input interpreter 250 and/or the client application 210.

Biometric block/unblock 286 enables the user to utilize biometric input (which may be speech, touch, motion, or visual input), to block or unblock access or use of the user's data. For example, if an unusual transaction is detected on the user's account, the user may, via client application 210 unblock the transaction without requiring calling or otherwise directly interacting with the application.

Anchor logic 288 enables the application server 280 to be used to place anchors in the text, as described above. In one embodiment, these anchors may direct the user to various locations within documents. In one embodiment, the anchors may also direct the user to various locations within an audio document, e.g. verbal instructions.

In this way, the system provides a task assistant that takes multimodal inputs, and provides multimodal outputs. The system provides an improved interface to an application.

Figure 3:
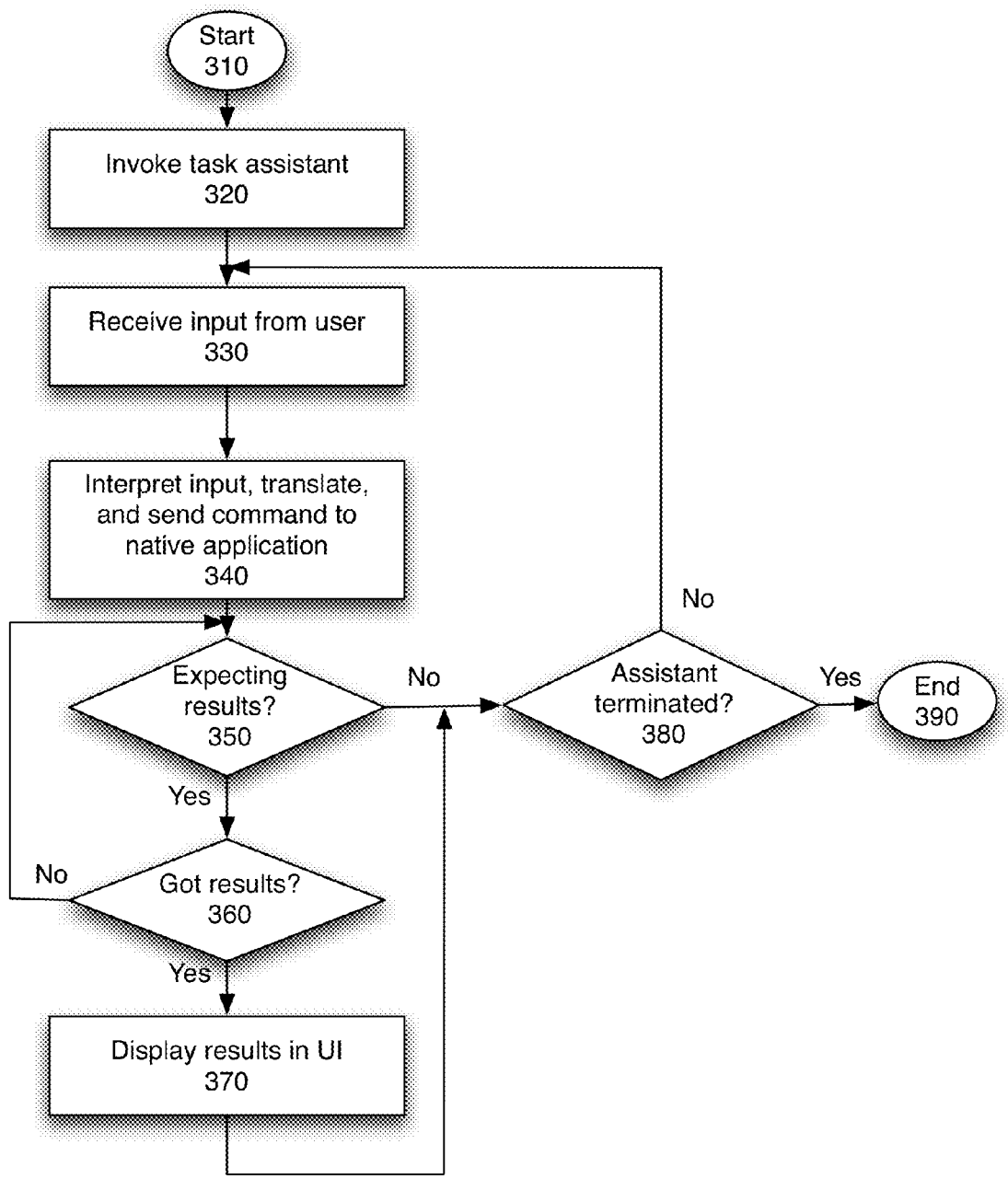
FIG. 3 is an overview flowchart of using a task assistant including multimodal user interface system.

FIG. 3 is an overview flowchart of using a task assistant including multimodal user interface system. The process starts at block 310. In one embodiment, This process in one embodiment is available whenever there is an application that has an associated task assistant.

At block 320, the task assistant is invoked. In one embodiment, the task assistant may be invoked using a soft invoke, such as a soft button. In one embodiment, the task assistant may be invoked using a verbal command. In one embodiment, the task assistant may be invoked using a motion command. Other methods of invoking the task assistant may be used.

At block 330, input is received from the user. The input may be in the form of text entry, speech entry, touch/motion entry, or another type of entry.

At block 340, the system interprets the input, translates it to the appropriate format, and sends the command to the native application. This translation enables the user to utilized standard speech, without having to remember particular commands, and control a native application that does not itself has speech interpretation or natural language capabilities.

At block 350, the process determines whether the user's input should cause an expected response. In one embodiment, the user input may be a request for data. In one embodiment, the user input may result in feedback indicating an unsuccessful or successful action. If results are expected, the process continues to block 360.

At block 360, the process determines whether the results are received. In one embodiment, results may be received from the application server or another location. Until results are received, the process waits. Once results are received, the process continues to block 370, to display the results in the user interface. In one embodiment, the results are displayed in the interface of the task assistant itself. In another embodiment, the results may be displayed in the user interface of the underlying application, rather than the task assistant. The process then continues to block 380.

If no results are expected, at block 350, the process continues directly to block 380.

At block 380, the process determines whether the task assistant has been terminated. In one embodiment, the task assistant may be manually terminated by the user. In one embodiment, the task assistant may be terminated when it times out, after it is not used for some time. If the process has not been terminated, the process returns to block 330 to await input from the user. Otherwise, at block 390, the process ends.

Figure 4A:
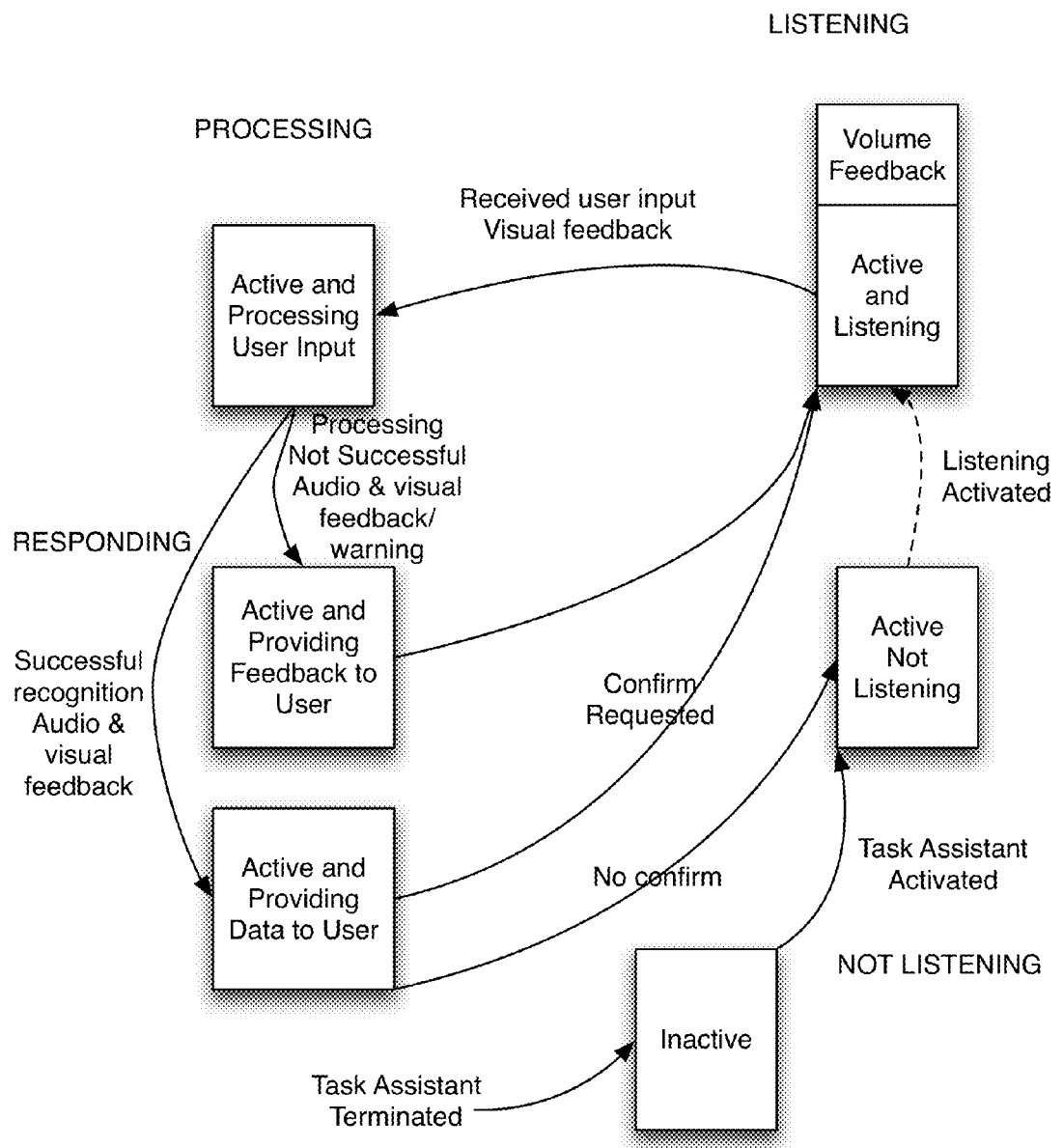
FIG. 4A is a state diagram of the various system states.
Figure 4B:
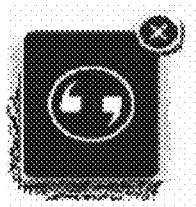
FIG. 4B-4F are screen shots of exemplary visual states of the input user interface for the task assistant.
Figure 4C:
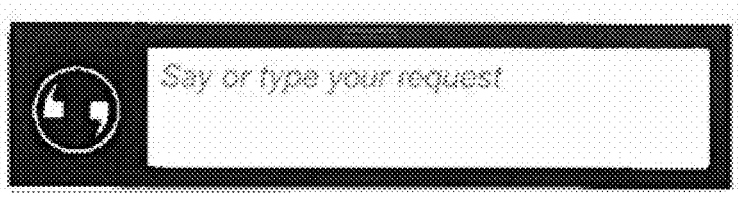
Figure 4D:
Figure 4E:
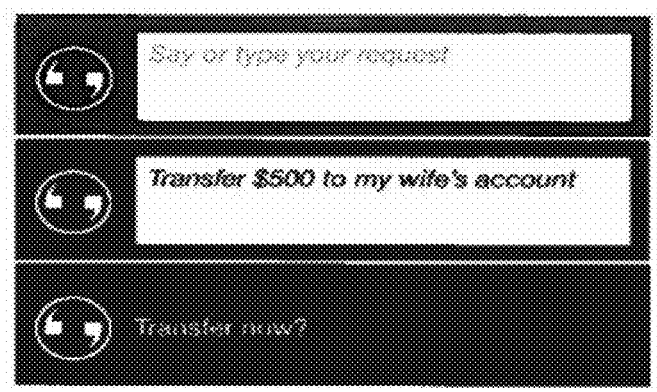
Figure 4F:
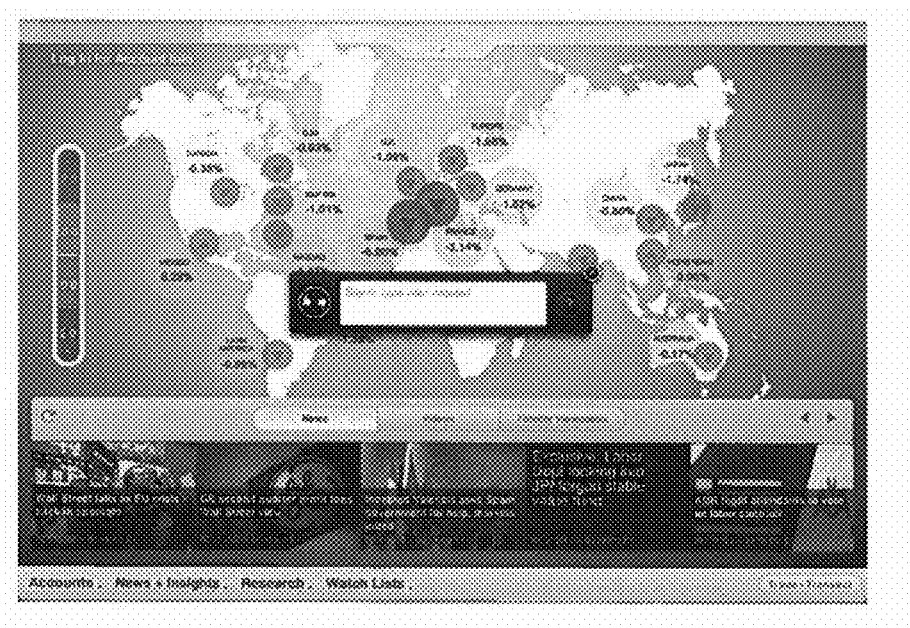

FIG. 4A is a state diagram of the various system states. These states are exemplary, and one or more of the states may be eliminated without altering the underlying functionality of the system. FIG. 4B shows exemplary visual representations of the various states. The system starts in the inactive state, in one embodiment. In one embodiment, the system is inactive when the user has affirmatively terminated the task assistant. In one embodiment, the task assistant is not inactive when the application to which it is attached is active. When active, the task assistant moves to the "active, not listening" state. In this state, the task assistant is not monitoring speech input.

When listening is activated, either via soft invocation or otherwise, the state changes to active and listening. Optionally, a volume feedback user interface feature may be displayed. This may be useful to show the user when the speech is too soft, or when the background noise is too high to successfully parse user voice input. In one embodiment, in the active/listening stage, the task assistant is also capable of accepting non-speech input such as text, gesture, or other input. In one embodiment, the listening state feedback provides a visual feedback using a minimal number of vector representations, such that the file size is small. For example, in one embodiment, the listening may be indicated by a spinning icon, while the user volume may be indicated by a brightening of the icon as the user's volume is increased. In one embodiment, this enables the icon to provide feedback, without necessitating the inclusion of an equalizer display or other separate means of state representation.

When user input is received, visual feedback is provided, indicating that a command/input has been received. The task assistant moves to the "active and processing user input" stage. In one embodiment, visual feedback is provided showing the processing. In one embodiment, this feedback is an animation, such as a spinning sign, or something similar, to indicate active processing.

When the user input is parsed, it is sent off to generate a response from the application, in one embodiment. In one embodiment, the system continues to display the "processing" state, while awaiting response. When response is received, the task assistant moves to the active an providing information to user state. In one embodiment, this includes response data such as past transactions or pending transactions, as well as input data confirming successful execution of a command, e.g. "As instructed, the invoice was authorized for payment and will be paid." The system then moves back to the active and listening state. In one embodiment, the user dismisses the information being provided.

Figure 5B:
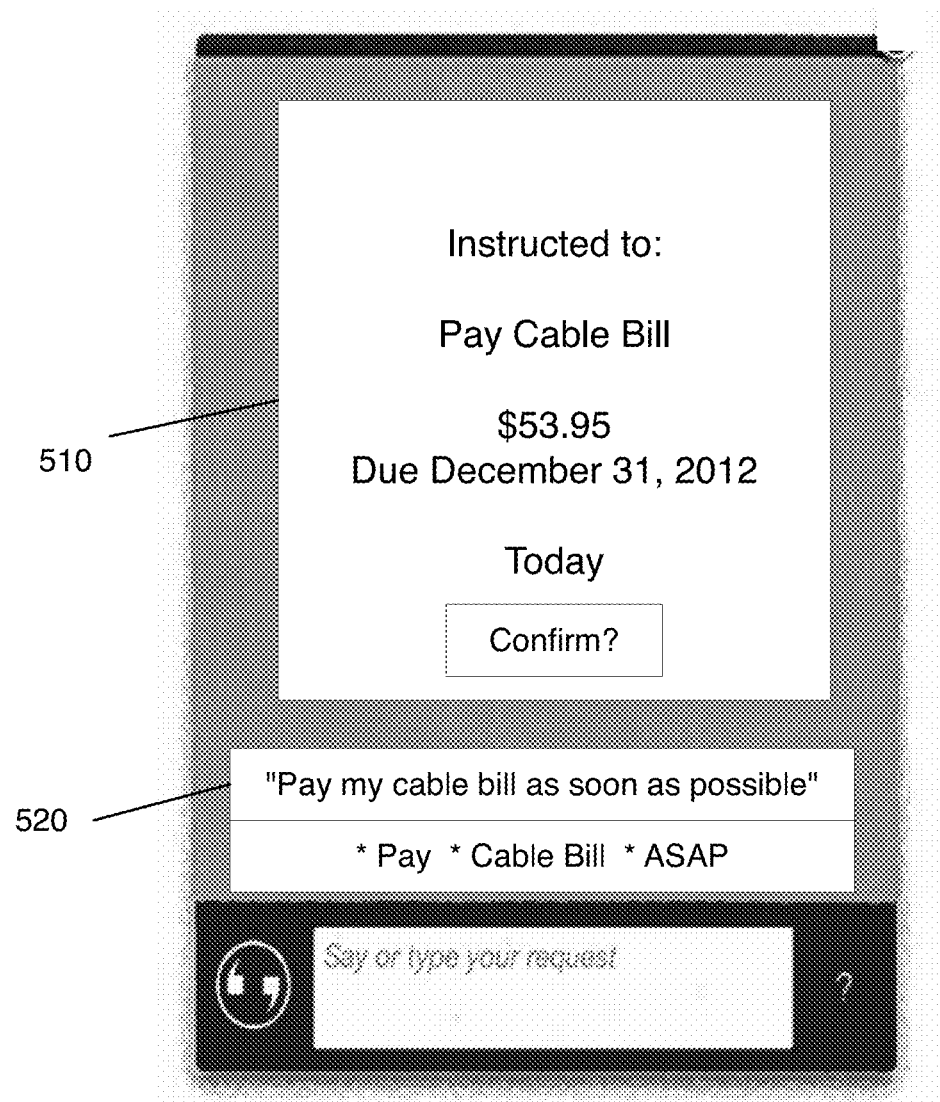
FIG. 5B-5F illustrate screen shots of the various output states of the output user interface for the task assistant.
Figure 5C:
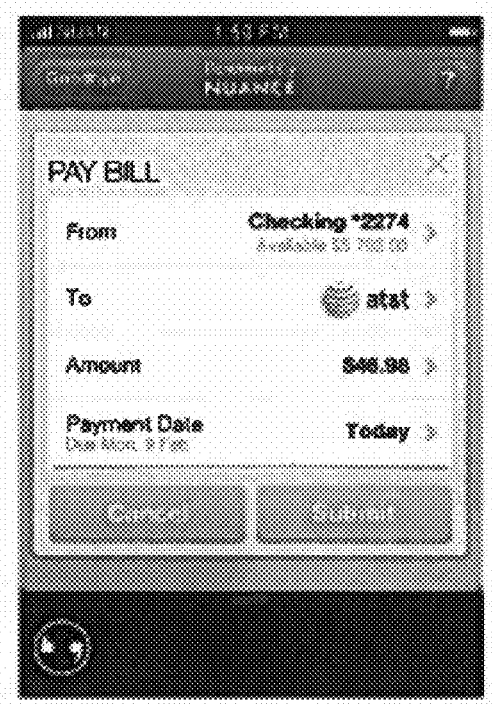

In one embodiment, the user may move directly back into the active and processing user input state, if the dismissal of the information being provided is accompanied by input requesting updated information. For example, the user may move from the active and providing info to the user stage to the active and processing user input stage by making an alteration to the displayed user query. FIG. 5B shows the Active and providing info to user display. As can be seen in that example, the query that was processed is displayed across the bottom, enabling the user to see the results of the processing of the user input. The user may move directly to this screen to the active and processing input screen, by, for example, removing one of the limitations shown in the user query. In one embodiment, this may be done by clicking on a selected limitation, thereby removing it.

In one embodiment, while the system is in the active and providing info to user state, the system is also actively listening for subsequent commands. Thus, the system loops back into the active and listening state.

If the user's input was not successfully parsed, the system moves to the Active and Providing feedback to the user. In one embodiment, a visual feedback indicating that the input could not be parsed is provided. The system then automatically moves back to the active and listening state, to await the user's corrected phrasing.

In one embodiment, this may be the case if the query could not be processed at all, e.g. the user input could not be parsed. In one embodiment, this may be the case when the query is incomplete, and additional data is requested. In one embodiment, in that case, the feedback includes asking for the missing information. For example, if the user, without context, asks for "my balance," the system may request the specific account(s) for which the user is requesting his or her balance. Thus, the system would go to active and providing feedback state, and request the user to specify the account. The system then moves to the active and listening state. As noted above, because context is maintained, the user may respond to this follow-up with a simple one word answer, without having to restate the original query.

In one embodiment, the user may cancel the unsuccessful query that resulted in a follow-up question. For example, the user may select a "cancel" option. In one embodiment, the system may accept a verbal cancelation as well, e.g. the user saying "cancel the prior request," or something similar. This, in one embodiment, removes that request from the context. In this way, the system moves through various states. In one embodiment, the system is always in the "Active and listening" stage unless the user manually inactivates the task assistant. The active and listening state is present when the system is parsing, as well as when the system is providing information and/or feedback to the user. In another embodiment, the system is in the active and listening state, except when the system is parsing a prior input. That is, in one embodiment when the system is actively processing input, it is not listening for user input.

FIG. 5A illustrates the various input and output formats, in one embodiment. The input formats, in one embodiment, includes voice input, e.g. the user speaking. In one embodiment, voice input utilizes natural language such that no commands are needed. In one embodiment, the system includes commands as well as natural language capabilities. The user may, in one embodiment, have short verbal commands for frequently used complex requests. For example, if the user often requests the past month's checks for amounts over $100 that have cleared, the system in one embodiment, enables the user to set up a shorter verbal command, as well as save the command as a Favorite, and thus repeat it with two clicks rather than having to phrase it.

Text input allows typed commands, and in one embodiment includes natural language parsing of text inputs.

Touch input, in one embodiment, includes the ability to dismiss elements of a previously executed command. In the above, example, if the user often requests the past month's checks for amounts over $100 that have cleared, the response may include the elements of the request, e.g. "past month" "checks" ">$100" "cleared." The user may dismiss one or more of these elements, for example the amount or the date range. Other touch inputs may include interacting with the displayed data returned by the task assistant, to obtain further information regarding a particular item.

Movement input, in one embodiment, includes command gestures. For example, the invocation of the task assistant may be done through a motion command. Another example is using motion commands to change pages, or cancel transactions. Other ways of using motion commands may also be used.

The system may also support multiple types of outputs. In one embodiment, speech input may enable the reading aloud of the response. Speech output may also include feedback output, e.g. requesting further information or indicating that the user input could not be parsed. In one embodiment, the system may additionally include non-substantive speech responses, e.g. a "thank you" or similar response to positive interactions. In one embodiment, the user may turn on and off speech output.

Non-speech sound outputs may include feedback sounds, e.g. a sound indicating that the system is processing, that the system could not parse input, or that additional data is needed. Non-speech sound outputs may also include non-substantive responses, such as a giggle or similar response to interactions.

Text output may include data output. It may also include text feedback. In one embodiment, the text output may be accompanied by an audio output to alert the user to the presence of the text output.

Non-text visual output may include relevant image data that is responsive to a query, as well as icons, color changes, intensity changes (e.g. brightening the screen) and other visual indicators that may be used. The non-text visual outputs may provide data, provide alerts, and/or provide non-substantive feedback. For example, in one embodiment, the task assistant may "blush" when complimented.

In one embodiment, the system may also provide haptic output. Haptic output is touch-based output, such as vibration. In one embodiment, haptic output may be used as a feedback mechanism, or an alerting mechanism.

FIG. 5B-F illustrate screen shots of the various output formats.

Figure 6:
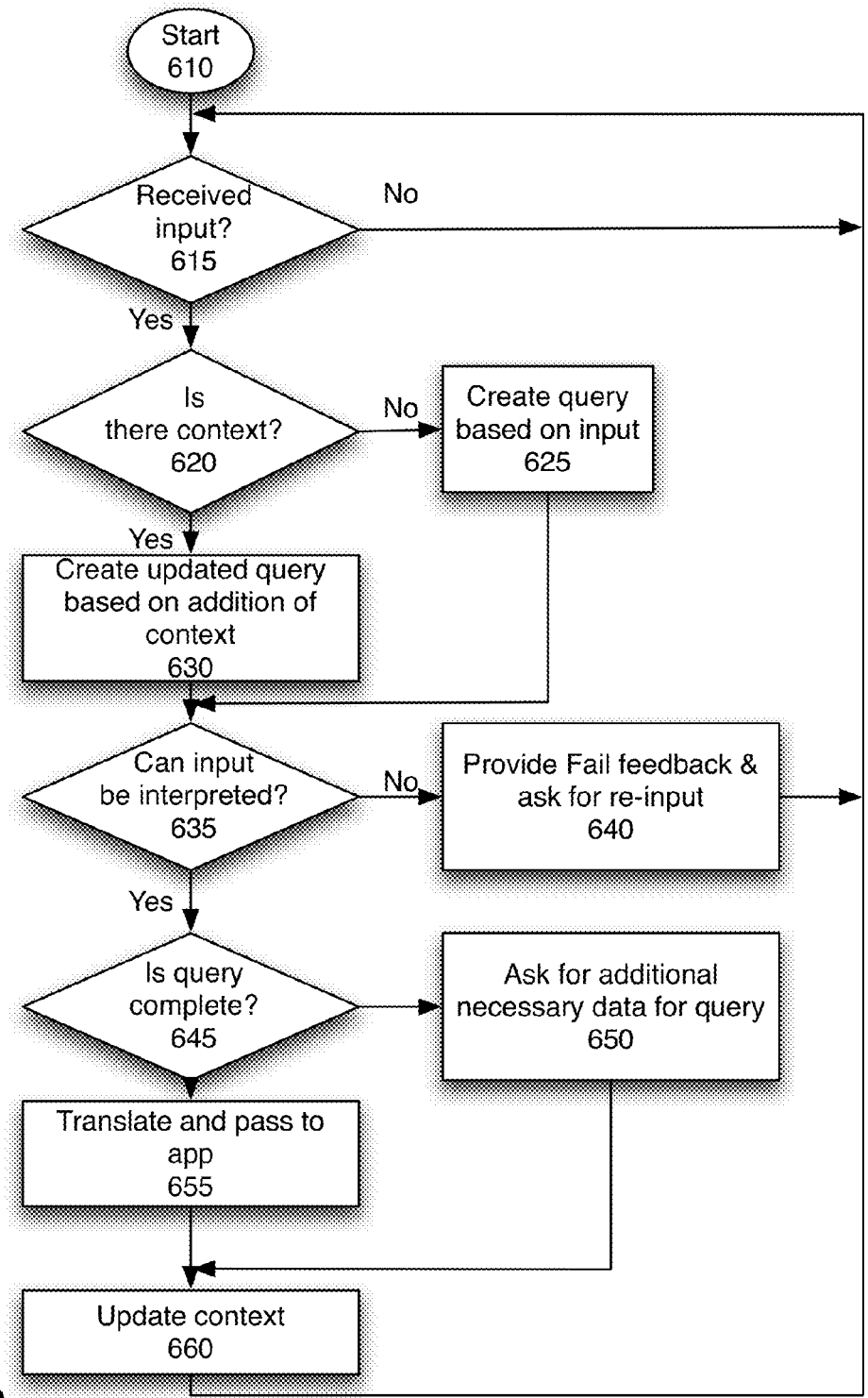
FIG. 6 is a flowchart of one embodiment of the input to the task assistant.

FIG. 6 is a flowchart of one embodiment of the input to the task assistant. The process starts at block 610. In one embodiment, the process starts whenever the task assistant is in the active listening state.

At block 615, the process determines whether input ahs been received. As noted above, input may be speech, typing/text, motion, or another format. The process waits for input, looping around until input is received.

When input is received at block 620 the process determines whether there is any context. Context is prior interactions, in the same session, which provide information used to interpret a request. If there is no context, at block 625 a query is crated based on the input. If there is context, at block 630 an updated query is created based on the input and the context. The process then continues to block 635.

At block 635, the process determines whether the input can be interpreted. An input can be interpreted if the query can be identified. If the input cannot be interpreted, at block 640, feedback is provided. The feedback indicates that the input could not be interpreted and asks for additional data. The process then returns to block 615, to await further input.

If the input could be interpreted, at block 635, the process continues to block 645. At block 645, the process determines whether the query is complete. A query is complete if it can be executed without any additional information. Some queries are not complete, because they require additional information. If the query is complete, at block 655, the query is passed to the application, translated if needed. Because the query can be entered in a natural language format, the query may need to be translated for the native application on which the task assistant depends. The completed query is then passed to the application, for response.

The system then updates the context based on the query data. This maintains the context with complete information. It also enables a later query to be much more succinct. The process then returns to block 615, to continue monitoring for input.

If the query is not complete, the process continues to block 650, and asks for the additional necessary data to complete the query. Because the system maintains state, the user need not provide the complete query, just the missing information. The process then continues to block 660, to update context, before returning to block 615, to await input of the additional data.

Figure 7:
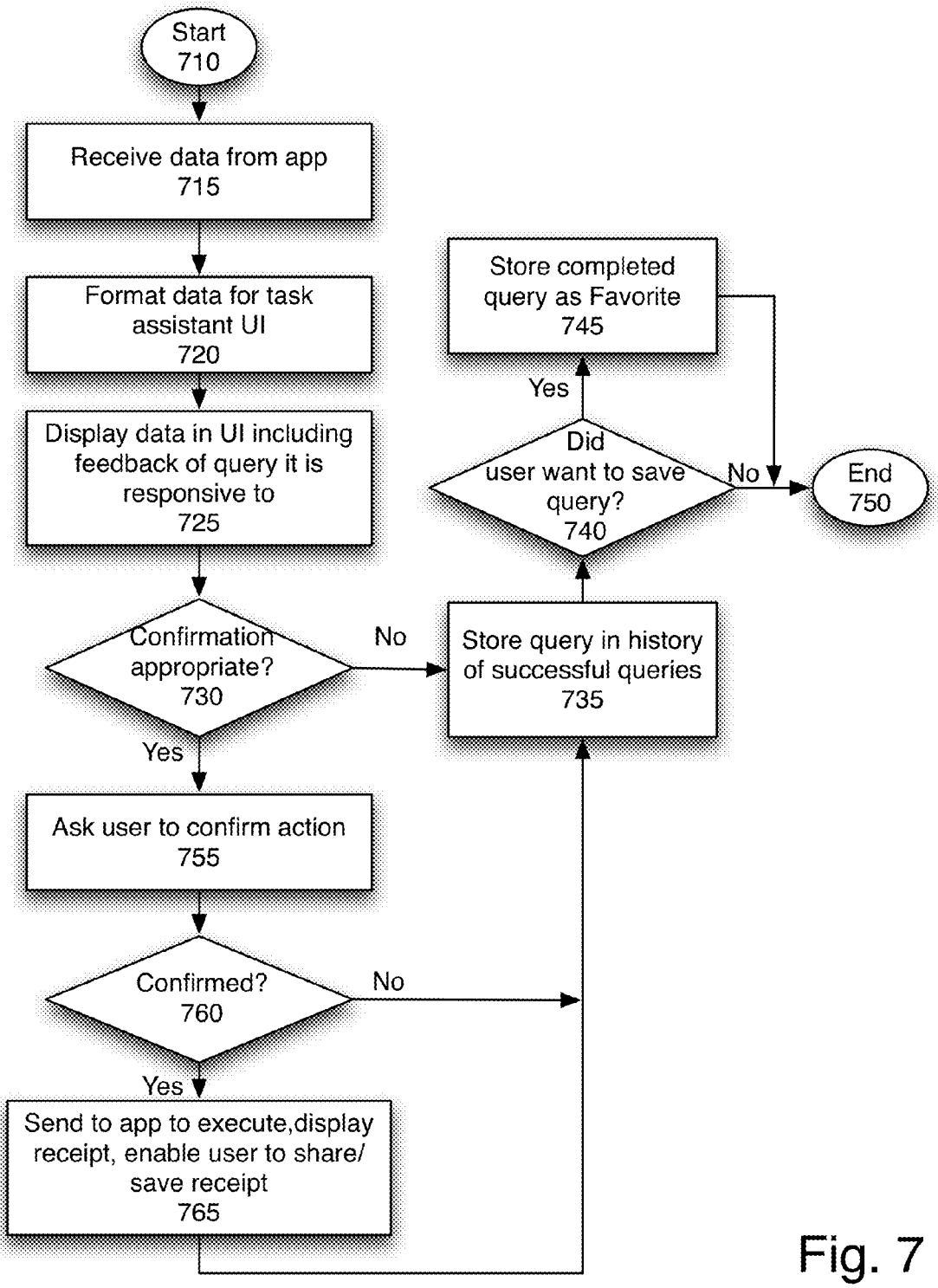
FIG. 7 is a flowchart of one embodiment of the output from the task assistant.

In this way, the task assistant monitors the system for input, and sends complete queries to the application for response. Once the application processes these responses in the conventional way, the data is passed to the application. FIG. 7 is a flowchart of one embodiment of the output from the task assistant when data is received from the application. The process starts at block 710. This process in one embodiment starts when the application indicates that it is about to send data to the task assistant.

At block 715, data is received from the application. In one embodiment, the data is received in the native format for the application.

At block 720, the data is formatted for the task assistant's user interface. In one embodiment, the formatting depends on the task assistant and the device on which the task assistant is running. For example, the data may need to be formatted differently when displaying on a mobile phone, a tablet computer, a desktop computer, or a kiosk display.

At block 725, the response data is displayed in the UI, including feedback of the query it is responsive to. One exemplary display is shown in FIG. 5B. The responsive data 510 is shown in one portion of the UI, while the interpreted query 520 is shown in a different portion of the UI. In one embodiment, the interpreted query is shown in a way that enables the user to interact with the interpreted query by removing portions of the query, or otherwise making alterations. In one embodiment, the raw query data and context is also shown.

At block 730, the process determines whether confirmation is appropriate for the data being presented. Confirmation, in one embodiment, is appropriate for any action instructed by the user. For example, if the original query/request was "Transfer $1000 from the savings account to the checking account," the responsive data indicates that this transfer request was received, and requests a confirmation. In one embodiment, any time the user is authorizing an action to be taken, rather than merely obtaining data about the existing status, confirmation is appropriate.

If confirmation is appropriate, the user is asked to confirm the action, at block 755. In one embodiment, the confirmation request may be part of the display UI, as shown in FIG. 5B, with a third portion of the UI requesting confirmation.

Figure 5D:
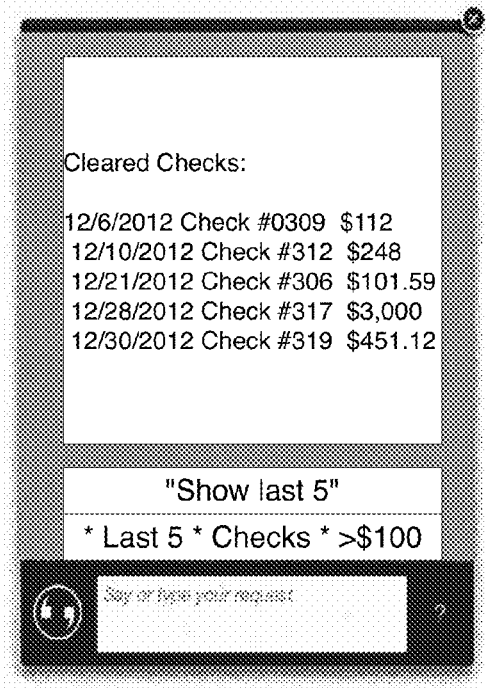
Figure 5E:
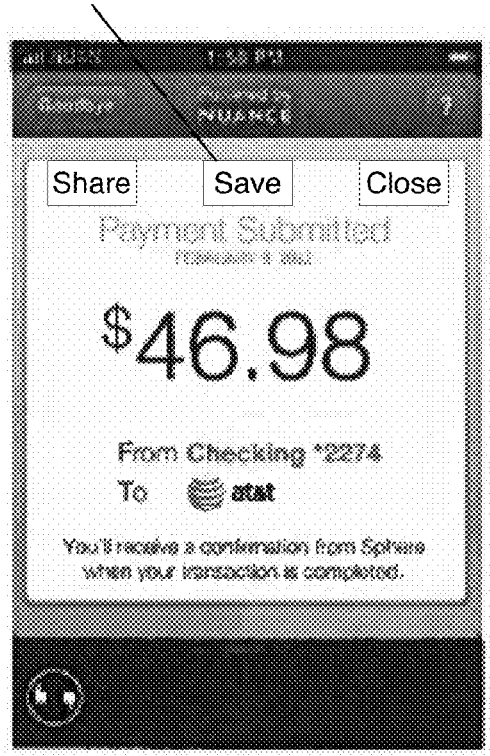

At block 760, the process determines whether the user has confirmed. If so, at block 765, the instructions are sent to the application to execute based on the confirmed action taken. In one embodiment, the process then provides a receipt to the user. FIG. 5E illustrates one embodiment of such a receipt. In one embodiment, the user is able to share and/or save the receipt. This may be used as proof that an action was taken. For example, if the user is sending money to someone, he or she may want to share that the money has been sent, by sharing the receipt. The process then continues to block 735. If at block 760, the user did not confirm the action, the process continues directly to block 735. If confirmation was determined not to be needed, at block 730, the process continues directly to block 735 as well.

At block 735, the query is stored in the history of successful queries. In one embodiment, the system maintains a store of successfully executed queries, in reverse historical order (e.g. most recent on the top).

At block 740, the process determines whether the user wants to save the query as a Favorite. In one embodiment, the response UI screen includes the option to save as favorite. This is shown in FIG. 5E, as Save 540. If the user wants to save the query, at bock 745, the query is saved into the favorites list. This would enable the user to select the query for repetition, rather than reentering the query and context. The process then ends at block 750.

Figure 8:
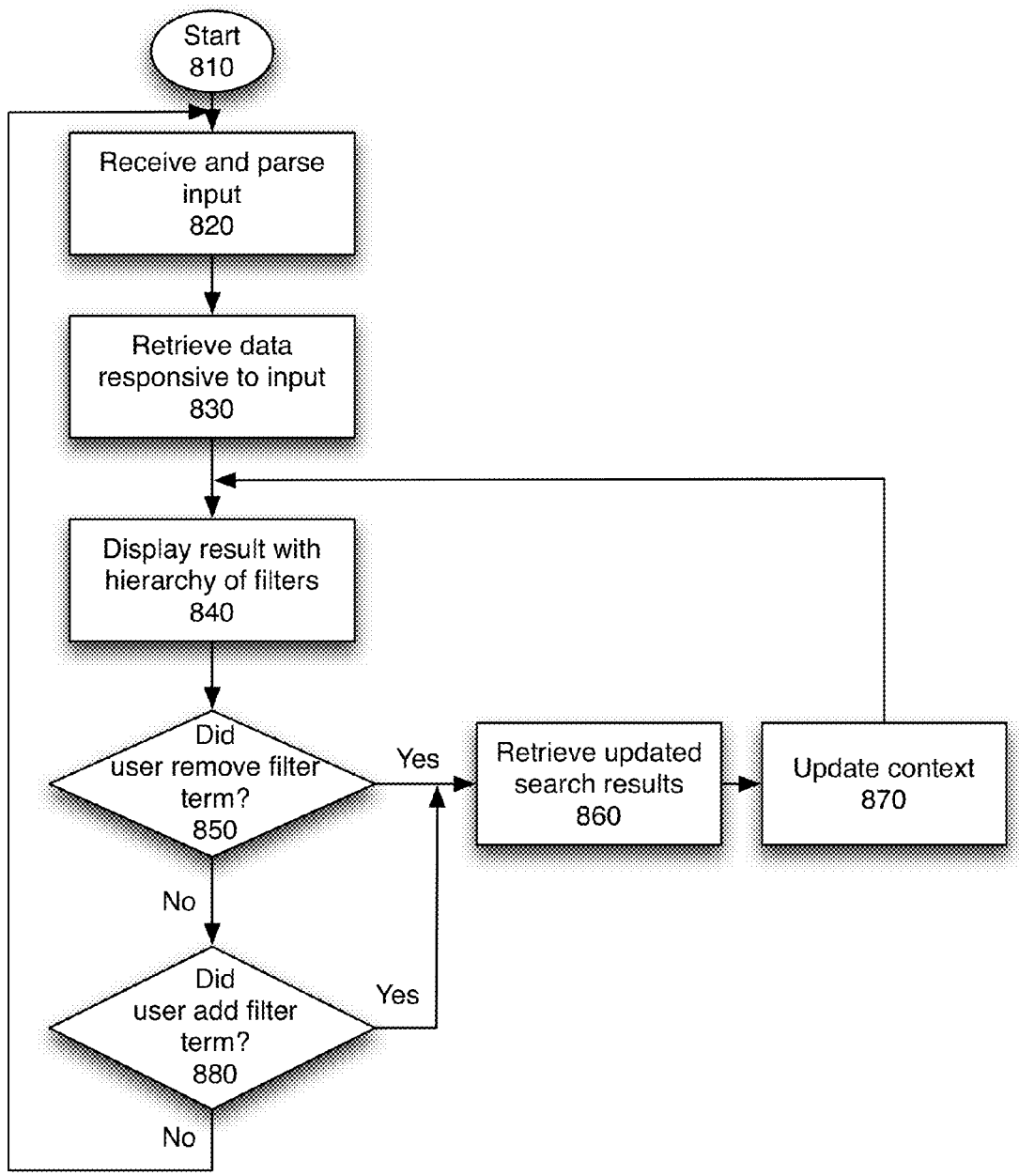
FIG. 8 is a flowchart of one embodiment of interactions maintaining context, enabling filtering.

FIG. 8 is a flowchart of one embodiment of interactions maintaining context, enabling filtering. The process starts at block 810. This flowchart shows an intersection of user input, application output, and user interaction with the output.

At block 820, input is received and parsed. In one embodiment, this includes the request for additional data, adding of context, and other aspects discussed above in connection with parsing input.

At block 830, data is retrieved in response to the input. In one embodiment, the data is retrieved from the native application.

At block 840, the result is displayed, along with the hierarchy of filters that were generated based on the query. FIG. 5B illustrates an exemplary display of the result. The hierarchy of results, in one embodiment, is displayed in order from least to most restrictive.

At block 850, the process determines whether the user removed a filter term. In one embodiment, the user may remove filter terms by clicking them in the results. In one embodiment, the user may remove filter terms by verbally instructing removal. Alternative ways of removing filter terms may be used. If the user removed the filter term, the process continues to block 860. At block 860, the updated query is sent to be processed, and the updated search results are retrieved. At block 870, the context is updated, and the process returns to block 840, to display the result with the updated search terms.

If the user did not remove a filter term, at block 850, the process determines at block 880 whether the user added a search term. In one embodiment, the user may add a search term by typing in an additional term, to add to the hierarchy of filters.

Figure 5F:

In one embodiment, some popular filtering search terms may be provided along with the results. In one embodiment, if there are more than a predetermined number of results to the query, additional filter terms may be provided for the user. For example, if the user's query is "transactions on account X" the most recent transactions may be provided in order. The system may further display likely limits, e.g. "cleared" or "last 10" or "this month" etc. FIG. 5D illustrates one example of such a transaction summary showing the last five checks that cleared. FIG. 5F illustrates an alternative example, showing recent transactions with a particular company, in the example shown, PETCO. In one embodiment, as shown, rather than presenting a scroll bar, which can be difficult to manage on a small screen, the system utilizes a paging display, here showing page one of two. If the user added a search term the process continues to block 850, to retrieve the updated results. Otherwise, the process returns to block 820, to await further input.

Figure 9:
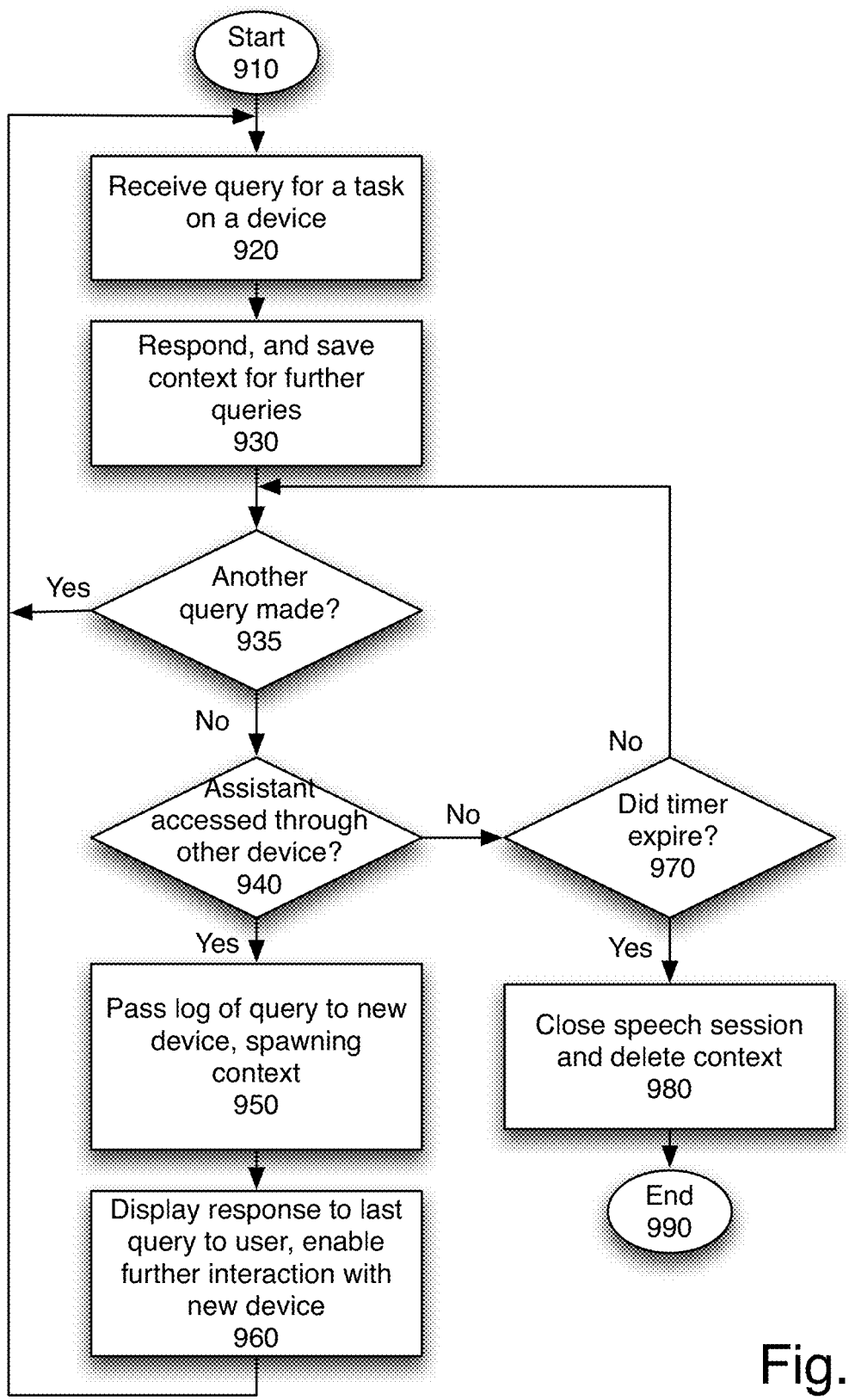
FIG. 9 is a flowchart of one embodiment of passing context between various devices that may be utilized by a user.

FIG. 9 is a flowchart of one embodiment of passing context between various devices that may be utilized by a user. The process starts at block 910. In one embodiment, this process is active whenever the task assistant is active.

At block 920, a query for a task is received on a device. In one embodiment, the processing described above with respect to FIG. 6 may be used.

At block 930, the process responds and saves the context of the request. In one embodiment, the processing described above with respect to FIG. 7 maybe used.

At block 935, the process determines whether the user made another query. If so, the process returns to block 920, to accept the query, and respond in the standard way.

If no additional query is made on the original device, the process continues to block 940.

At block 940, the process determines if the user accessed the task assistant via another device. In one embodiment, an active session, including context, may be transferred from one device to another. In one embodiment, if the same account is logged into, while the session is active, the user's context is transferred. In one embodiment, this is done by allowing the new device access to a log of the prior queries. In one embodiment, this means that a user may be able to see the results of a query on multiple devices concurrently. In one embodiment, the system then mirrors the same responses to queries to multiple devices.

If the user did not access the task from a different device, the process at block 970 determines whether the timer has expired. The timer, in one embodiment, times out the log that is maintained, after a period of time. If not, the process returns to block 935 to continue monitoring for another query on the same device or a different device. If the timer has expired, at block 980, the log is deleted, and the task assistant is closed. The process then ends at block 990.

If at block 940, the process determined that the user is accessing the same task assistant through another device, the process continues to block 950.

At block 950, the log of the query is passed to the new device. In one embodiment, the log includes all prior queries, which remain relevant, executed during this session. In another embodiment, the log includes the last successful query only. The log spawns the context on the new device. In one embodiment, the system then closes the task assistant on the device that has been transferred from.

At block 960, the system displays the response to the last query executed on the prior device to the user, and enables the user to further interact with the new device. In one embodiment, the system indicates that context has been transferred, and enables the user to terminate the context. In one embodiment, the user is thus shown the same screen on the new device that was last seen prior to the transfer to the new device. In this way, in one embodiment, a seamless to the user transfer can be achieved. In one embodiment, this can be particularly useful when the user is working on a small screen and the requested data is of significant size. For example, in a medical application, if the user requests an image on a small device, it may be very useful to transfer the request to a larger device.

In one embodiment, the transfer to the other device may be initiated in various ways. In one embodiment, the user may simply log into the second device's application. In one embodiment, the user may log into the second device's application, while having the first device in close proximity. In one embodiment, the second device and the first device communicate over a local area network such as Bluetooth to verify proximity. In one embodiment, a gesture may be used on a mobile device to transfer context to the other device. In one embodiment, contact between the devices may be used to initialize transfer of context. Alternative means of transferring context may be used.

Figure 10:
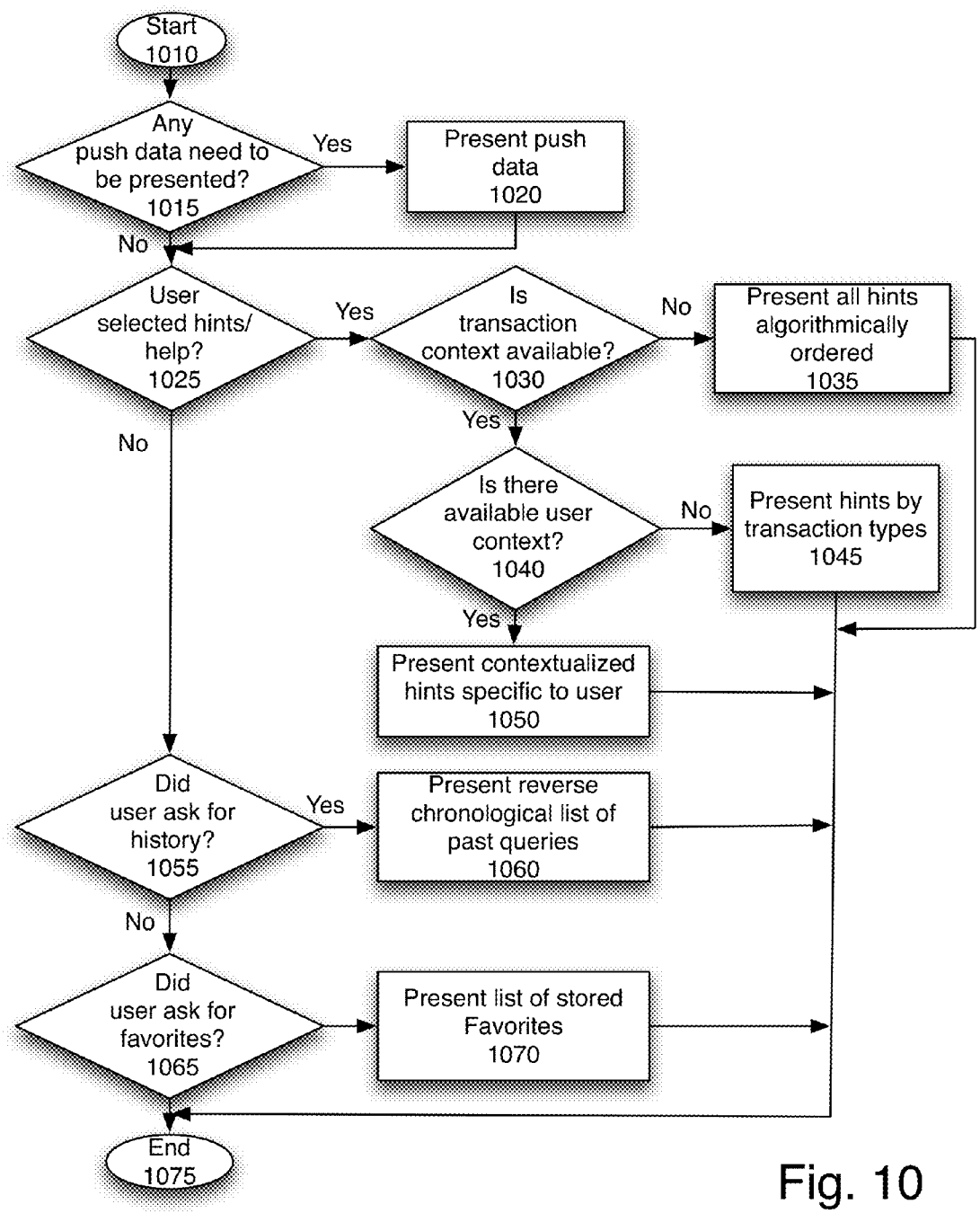
FIG. 10 is a flowchart of one embodiment of contextual suggestions.

FIG. 10 is a flowchart of one embodiment of push navigation and other information assistance provided to the user. The assistance may be in various formats. The process starts at block 1010. In one embodiment, the process starts when the user logs into the system, or accesses the device on which the system resides. In one embodiment, for certain push navigation modes, the push navigation may be done as a notification presented outside the application, on a mobile or other device.

At block 1015, the process determines whether there is any push navigation information that needs to be presented to the user. Push navigation includes, in one embodiment, pages that the user is navigated to, without the user's request. This may include new usage terms, changes in the structure or authentication of the service, other aspects that the user needs to be informed about. In one embodiment, push navigation includes promotional insets. In one embodiment, push navigation includes a system modal alert.

In one embodiment, push navigation may include other notifications that are presented to the user. Such notifications may include, for example, account blocks, confirmation required actions, notifications requiring acknowledgement, etc. For example, in a banking context, the push navigation may provide a notice if there is an insufficient funds issue, or a potential credit card block place. In a travel context, the push navigation may provide a notice of a flight delay, availability of an upgrade, or price change for a ticket. In a medical context, the push navigation may provide a notice of results being available, a need to come in to the doctor's office, etc. In one embodiment, the push notification may be generated outside the application. In one embodiment, the push notification may be generated outside the user device, on a server, or in the network cloud.

If there are any push navigation destinations, at block 1020 the push navigation information is presented to the user. In one embodiment, the user is informed of the push navigation destination, and given a mechanism to return to their prior location in the application/task assistant. In one embodiment, the push data may be presented in the applications native UI, once the task assistant recognizes the presence of such push data, and navigates to them. In one embodiment, the push data may be presented in a pop-up or similar mechanism. In one embodiment, the push navigation may be presented as part of the hints panel, as a separate tab.

The process then continues to block 1025. If there was no push navigation data found at block 1015, the process continues directly to block 1025. In another embodiment, if the push navigation data is presented outside the application itself, when the user acknowledges the push navigation data, the push navigation data is dismissed, and the user is returned to the previous state of the device. If push navigation was accessed within the application, the process continues as described below.

Figure 11A:
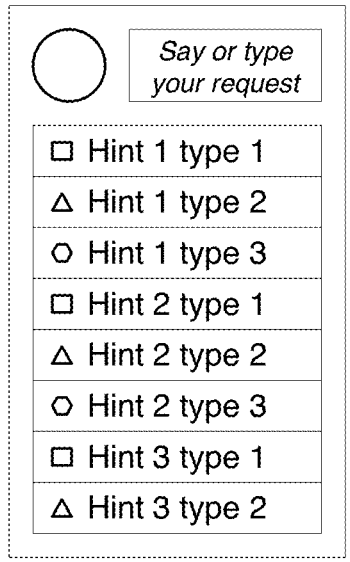
FIG. 11A-11F are illustrations of exemplary contextual suggestions.
Figure 11B:
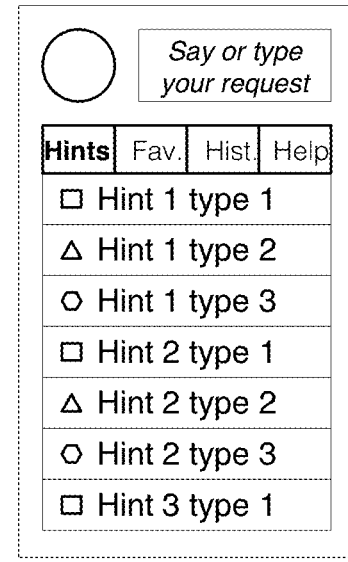
Figure 11C:
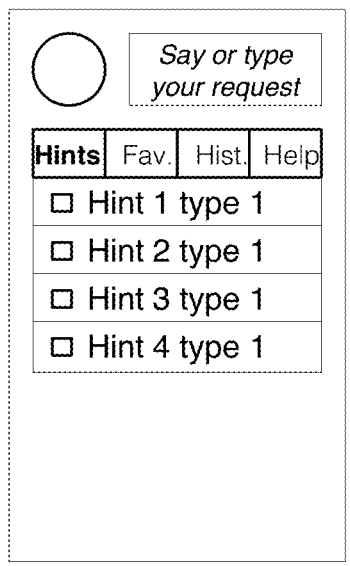
Figure 11D:
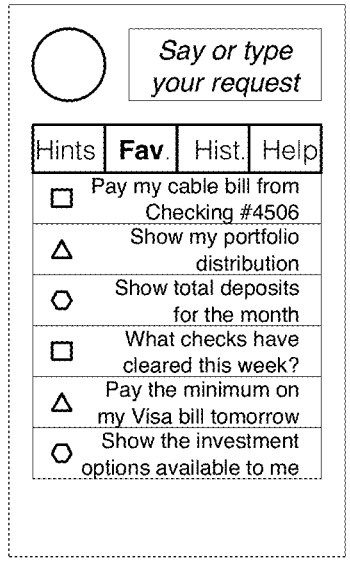
Figure 11E:
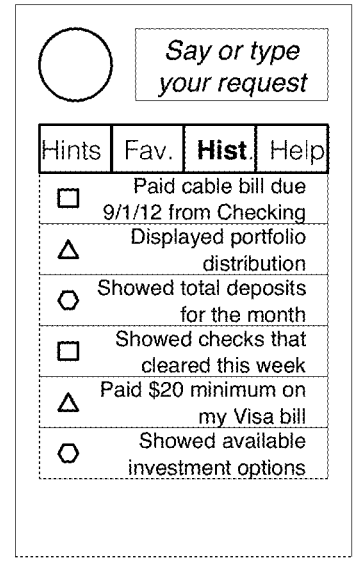

At block 1025, the process determines whether the user navigated to the hints panel. FIG. 11B illustrates one embodiment of a user interface display shows the various types of help available in separate tabs. In one embodiment, the hints panel is available at any time using a typical discoverable user interface, such as a button or gesture interface. For example, in one embodiment, an upward swipe on a touch screen device may take the user to the hints panel. In one embodiment, other simple gestures, shaking the device, swiping across, tapping in a particular pattern, may also invoke the hints panel. In one embodiment, the user may also manually navigate to the hints panel.

If so, the process determines at block 1030 whether there is transaction context available. Transaction context is based on the user's interactions with the system in this session, including which page the help page was invoked from, prior requests, and any unsuccessful attempts at queries.

If there is no transaction context, at block 1035, the hints are presented in an algorithmic order. In one embodiment, the algorithmic order is a random order, set so that the user is unlikely to see the same subset of hints on subsequent visits. In one embodiment, the algorithmic order is based on query complexity, starting with the simplest query. In one embodiment, the algorithmic order is based on one or more of query complexity, query frequency, and prior viewing of the hints. In one embodiment, the algorithmic order may further include sub-sections based on query types, such that the user can restrict the hints by adding a context. One example of such a listing of hints is shown in FIG. 11A. In one embodiment, once the user selects a particular hint type, subsequent hints focus on the selected hint type in one embodiment. The process then ends, at block 1075.

If there is transaction context, the process continues to block 1040. At block 1040, the process determines whether there is available user context. User context provides personalization, such that the hints are not only relevant to the transaction, but also relevant to the user. For example, instead of saying "Would you like to pay your bills" the user context personalized hint may say "Would you like to pay your Cable Bill of $42.99."

If user context is available, at block 1050, the personalized subset of hints are presented to the user. The personalized subset of hints, in one embodiment, relate to the user context. The process then ends, at block 1075.

If no user context is available, the process at block 1045, presents the transaction-context based relevant hints. The process then ends at block 1075.

Note that while not illustrated, in one embodiment, the user may interact with the hints. For example, the user may select a hint, and continue to a linked hint, or return from a particular hint to the hint type. As the user navigates, in one embodiment, the system builds up user context and transaction context for further hint displays.

If, at block 1025, it was found that the user did not invoke hints, the process continues to block 1055, and determines whether the user wished to view the history. History is the list of past successful queries that were executed by this user on the system. If the user is requesting history, at block 1060, a reverse chronological list of past successful requests is presented to the user. The process then ends.

Figure 11F:
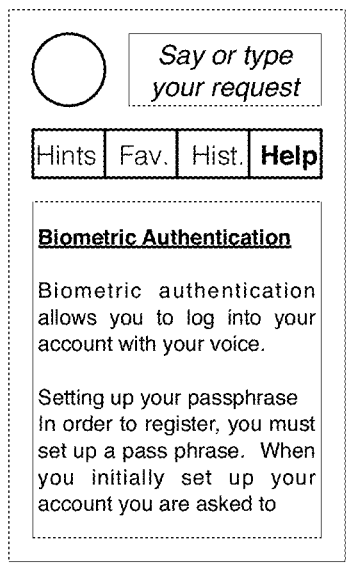

If the user did not ask for history, the process determines whether the user requested to see his or her favorites, at block 1065. Favorites are stored past transactions that had been marked as "Favorite" so that they would remain available. If the user asks for favorites, at block 1070, the favorites are displayed. In one embodiment, the favorites are displayed in a reverse chronological order. In another embodiment, favorites may be displayed by request type, complexity, frequency of use, or other ordering methods. The process then ends at block 1075. While not illustrated, in one embodiment, the help system also includes the traditional Help feature, which provides data to the user about the page from which the help feature is invoked. In one embodiment, this may include providing description of the techniques as well as the modes of interaction available. FIG. 11F illustrates one embodiment of such a page.

Figure 12:
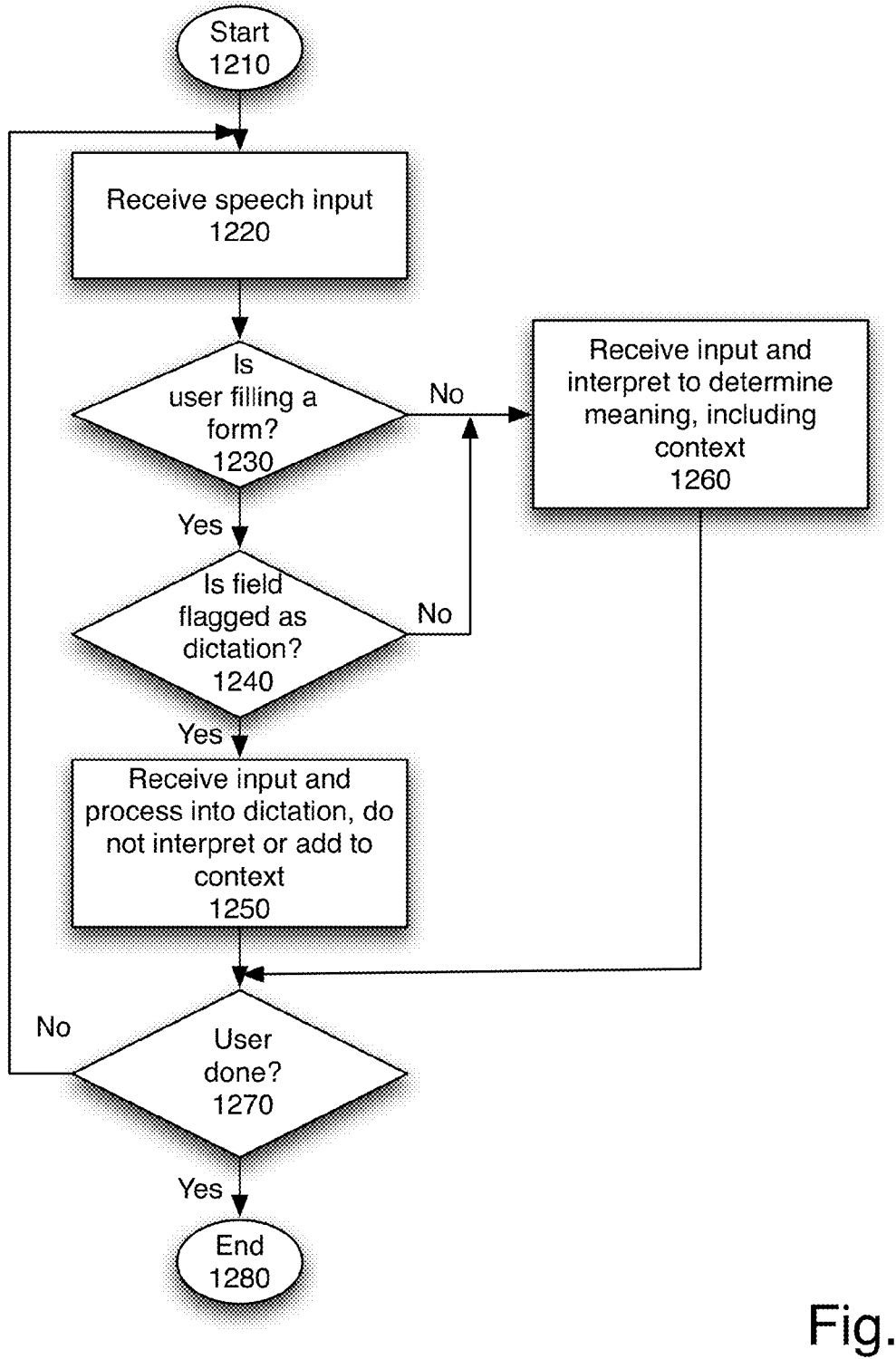
FIG. 12 is a flowchart of one embodiment of intelligent form filling.

FIG. 12 is a flowchart of one embodiment of intelligent form filling. The process starts at block 1210. At block 1220, speech input is received. At block 1230, the process determines whether the speech input is associated with the user filling a form. In one embodiment, the user may utilize the task assistant's multimodal input to fill forms. If the user is not filling a form, at block 1260, the process receives the speech input, analyzes it to determine the query being made. That is, the speech input is treated as command input. The process then continues to block 1270 to determine whether the user is done. In one embodiment, whether the user is done may be determined by the user manually indicating being done, or stopping speech input for a preset period of time. If the user is not yet done, the process returns to block 1220, to continue receiving speech input. In one embodiment, the user can continuously speak during this process. When the user is done, the process terminates at block 1280.

If the user was found to be filling a form, at block 1230, the process determines at block 1240 whether the field being filled is flagged for dictation. In many documents that may be filled by a user, there are fields that require content such as filling in one's name, and some fields that are free form and accept dictation. For example, a "comment" section in a check payment is free form data. If the field is not flagged as dictation, the process continues to block 1260 and treats the user's speech input as query/command input.

If the field is flagged as dictation, at block 1250, the input is received and processed for text recognition without interpretation or context. The system simply converts speech to text, and places the text in the "dictation" flagged field. The process then continues to block 1270 to determine whether the user is done.

In this way, the system enables the user to have a speech input, for commands or dictation, without requiring the user to manually make the selection or without cluttering up the display.

Figure 13:
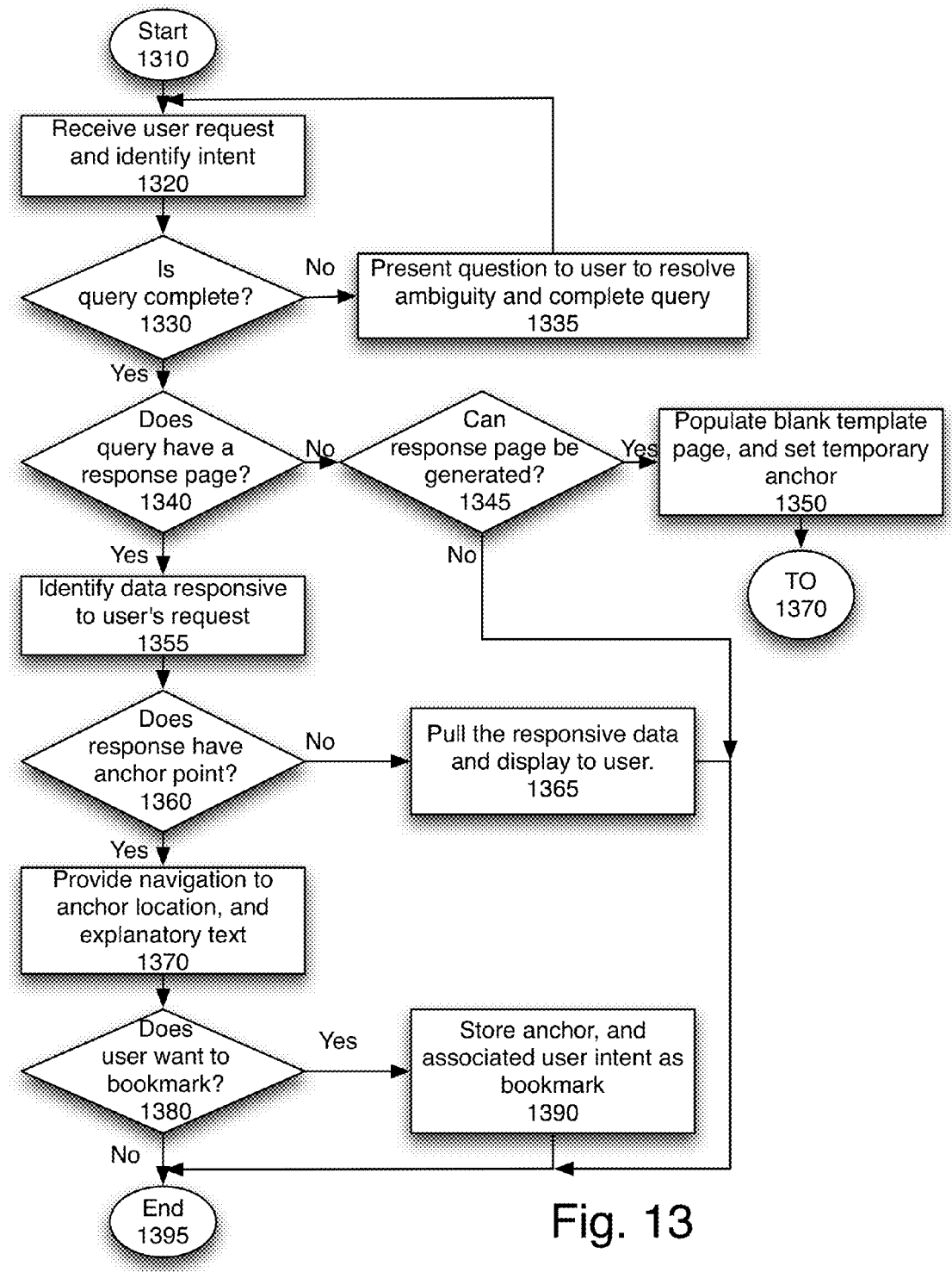
FIG. 13 is a flowchart of one embodiment of navigation using anchor points.

FIG. 13 is a flowchart of one embodiment of navigation using anchor points. The process starts at block 1310. At block 1320, user input is received, and interpreted.

At block 1330, the process determines whether the query is complete, and can be sent to the application for response. If the query is not complete, the process at block 1335 requests additional information from the user. In one embodiment, the additional information request may be in the form of a question. In one embodiment, the question may be asked verbally, requesting a speech-based response. Alternatively, the question may be presented in different ways. The process then returns to block 1320, to await the user's response to the question to complete the query.

If the query is complete, the process continues to block 1340. At block 1340, the process determines whether the query has a response page. If so, the process continues to block 1355.

At block 1355, the process identifies data responsive to the user's request. At block 1360, the process determines whether the data has an associated anchor point. Data that is associated that text, rather than active data, is associated with anchor points. If there is no associated anchor point, at block 1365, the data is pulled and displayed to the user. If there is an associated anchor point, the process continues to block 1370.

At block 1370, the system provides navigation to the relevant anchor point, and provides the information requested by the user. FIG. 14 illustrates an exemplary text with anchor points. Anchor points may be at the top of a page of text, or within the text itself. In either case, the anchor point provides a navigation location, to which the user can go. This enables the user to directly go to the relevant segment in the text.

At block 1380, the process determines whether the user wishes to bookmark the anchor point. If so, the anchor is stored, and associated with the user intent/user request. In one embodiment, such bookmarks are stored in a similar list as favorites. The process then ends at block 1395.

If, at block 1340, the process determined that the query has does not have a response page, the process continues to block 1345.

At block 1345, the process determines whether a response page can be generated. If so, at block 1350, a blank template page is generated, and a temporary anchor is set for the newly generated page. This on-the-fly generation of the response page is used to enable data collection without multiple pages, and data presentation in a more convenient format. By including a temporary anchor for the blank template, the system enables the user to bookmark the generated page, for later reuse. The process then continues to block 1370. If no response page can be generated, at block 1345, the process ends at block 1395.

Figure 15:
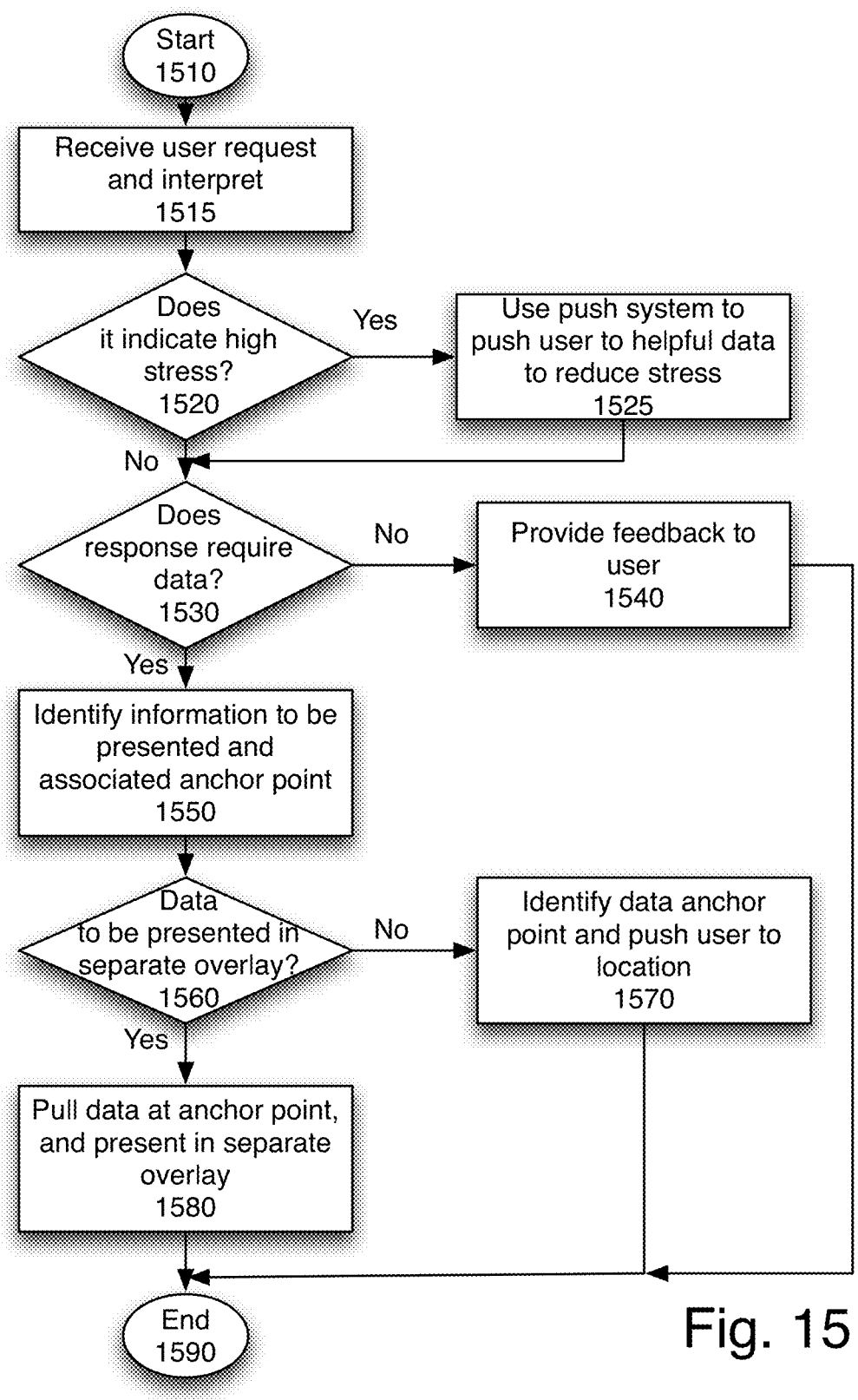
FIG. 15 is a flowchart of one embodiment of incorporating push navigation into navigation including anchor points.

FIG. 15 is a flowchart of one embodiment of incorporating push navigation into navigation including anchor points. The process starts at block 1510.

The process starts at block 1510. At block 1515, user input is received, and interpreted.

At block 1520, the process determines whether the interaction indicates that the user is under high stress, or in a bad mood, or otherwise should have additional interaction, based on something other than the request itself. In one embodiment, push notifications may be invoked when the system determines that the user is in a high stress situation, or a bad mood, and presenting either help or additional information would be useful. In one embodiment, such a high stress situations may be identified based sensing speech patterns, sensing movements indicating stress level, identifying words indicating stress, and interpreting interactions with the system. In one embodiment, in addition to providing push navigation in response to such high stress situations, the system may also provide other feedback, in response.

If the system determines that the user's request indicates high stress, the process at block 1525, uses the push system to push helpful data to the user, to reduce stress. In one embodiment, the helpful data may provide feedback on how to fix an inaccurate interaction with the system. In one embodiment, the helpful location may provide suggestions on how to phrase a request. In one embodiment, the helpful data may be a content-free interaction designed to reduce stress. In one embodiment, the helpful data may provide other data. The process enables, in one embodiment, the user to return to block 1530, from the pushed data. If the interaction did not indicate high stress, the process continues directly to block 1530.

At block 1530, the process determines whether the query requires a data based response. In one embodiment, some queries do not require data as a response. If no data is required, for example the interaction is content free, at block 1540, feedback is provided to the user. This enables "social" interactions between the task assistant and the user. The process then ends at block 1590.

If the response requires data, at block 1550, the information to be presented is identified, and so is the associated anchor point if it exists. At block 1560, the process determines whether the data should be presented in a separate overlay. In one embodiment, data from a document with anchor points may be presented as part of the continuous document, or in a separate overlay format.

If the data should be presented inline, the process continues to block 1570. At block 1570, the system provides navigation to the relevant anchor point, and provides the information requested by the user. FIG. 14 illustrates an exemplary text with anchor points. Anchor points may be at the top of a page of text, or within the text itself. In either case, the anchor point provides a navigation location, to which the user can go. This enables the user to directly go to the relevant segment in the text. The process then ends.

Alternative, at block 1580, the data is pulled from the anchor point, and presented in a separate overlay. This enables the presentation of complex data without clutter. The process then ends at block 1590.

Figure 16:
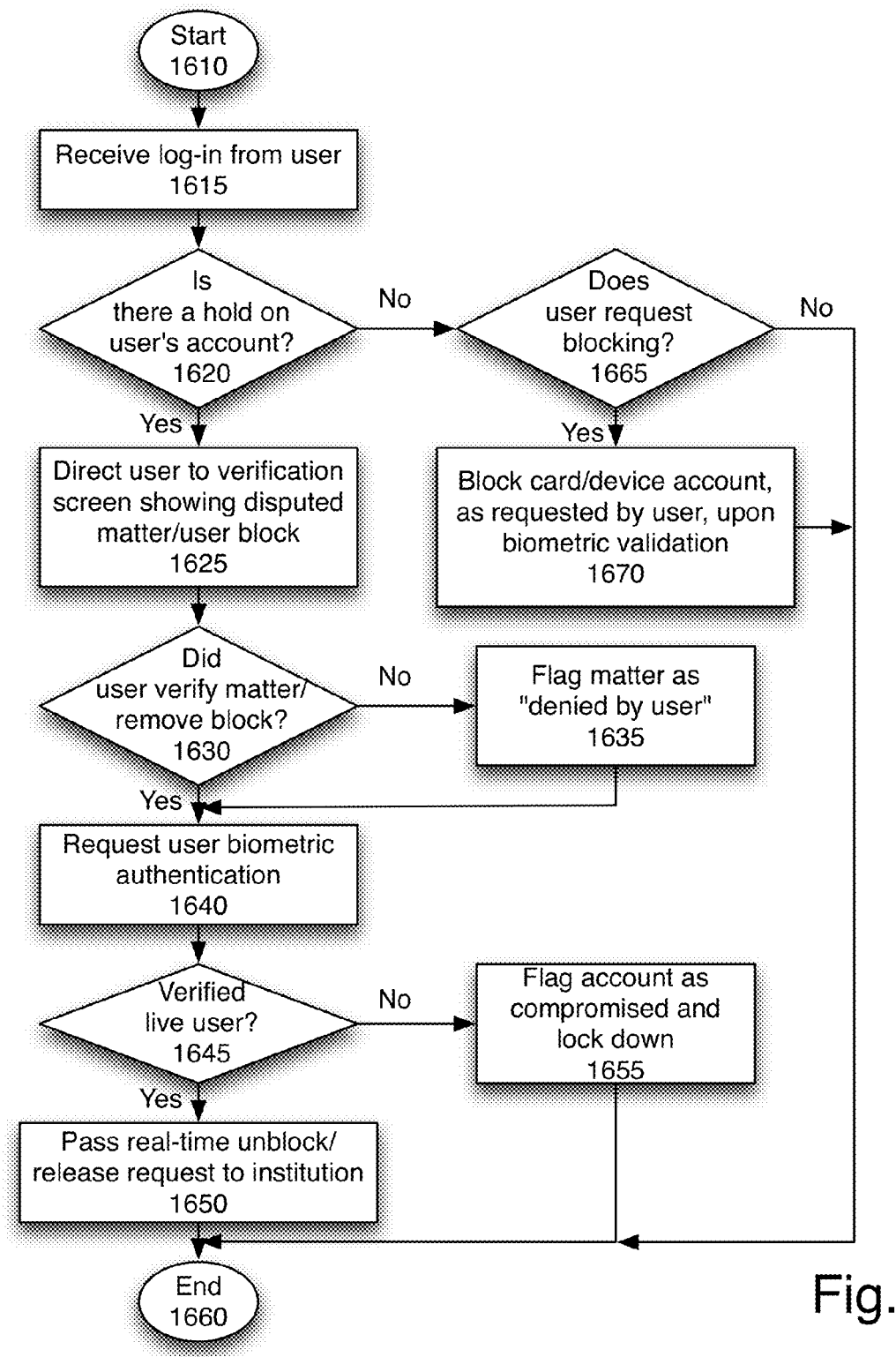
FIG. 16 is a flowchart of one embodiment of utilizing biometric authorization.

FIG. 16 is a flowchart of one embodiment of utilizing biometric authorization. The process starts at block 1610. In one embodiment, the process starts when the user opens the underlying application. At block 1615, log-in is received from the user. In one embodiment, the user may log into the system using a voice biometric. In one embodiment, a password or other method of logging in, a combined method may be used.

At block 1620, the process determines whether there is a hold or block on the user's account. A user account hold may be placed, for example on a banking application, if there is suspicious activity. This suspicious activity may have taken place within the application or in association with a credit card or other payment format affiliated with the application. A block may be placed by the user, as described below.

If there is a hold or block on the account, at block 1625, the user is directed to a verification screen, showing the disputed matter or block. In one embodiment, the push navigation method, described above, may be used for this feature.

At block 1630, the process determines whether the user validated the matter/removed the block. The user may indicate that he or she approves the transaction, and wishes for it to be completed, if the hold is of a particular transaction. The user may indicate that he or she wishes to remove the block on the account, reactivate the particular card, re-enable access through a particular device, or otherwise adjust the system. If the user does not choose to validate the matter/remove the block, the item may be flagged as "denied by user," at block 1635. If the block is present, the block may be maintained.

If the user indicates that he or she wishes to approve the action, the process continues to block 1640.

At block 1640, biometric authentication is requested. This is to ensure that only the actual user can approve any such flagged transactions, or block or unblock the account, card, device, etc. In one embodiment, biometric authentication includes a discrimination task to ensure that the biometric data is being entered by the live user, rather than being replayed. Thus, in one embodiment, instead of simply using a voiceprint in a password, the user is presented with a discrimination task, using the multimodal features of the task assistant. For example, the user may be asked to say a word displayed on the screen, draw a shape as indicated via speech or text, etc. By requiring a non-recordable action, replay attacks are prevented.

At block 1645, the process determines whether the user's biometric identity has been successfully received and live user status has been verified. In one embodiment, the biometric may be a voice biometric, enabling the speech processing system to be used. In one embodiment, multiple aspects of the multimodal system are used, requiring the user to prove not only his or her identity, but also that he or she is in possession of the appropriate user device.

If the user's identity is verified, the real-time unblock/release request is passed to the application, at block 1650. The application can then quickly unblock the account hold. This enables real-time unblocking/releasing of blocks and approval of questionable transactions by an authenticated user. If the verification fails, at block 1645, the account may be flagged as compromised and locked down. In one embodiment, this only occurs after multiple failed biometric authentications. The process then ends at block 1660.

In one embodiment, at block 1620, if there are no holds or blocks on the user account the process continues to block 1665. At block 1665, the system enables the user to request blocking of a transaction and/or a card or device. If the user requests blocking, the system at block 1670 blocks the card/device/account as requested. In one embodiment, the user's biometric authentication is also requested for such a blocking option.

In this way, the system enables a user to unblock transactions, or block transactions nearly in real-time without having to go through the cumbersome system provided by most institutions for unblocking blocked transactions. Additionally, in one embodiment, this system may be used to enable the user to quickly block problematic transactions as they are initially noticed. By being able to track activity in nearly real-time, the cost to institutions, as well as the risk to users, is significantly reduced. Furthermore, by providing to the user the ability to request temporary blocking of the account, the needless expense and frustration of having to cancel accounts and reorder cards when a device or card is misplaced is also eliminated.

Figure 17:
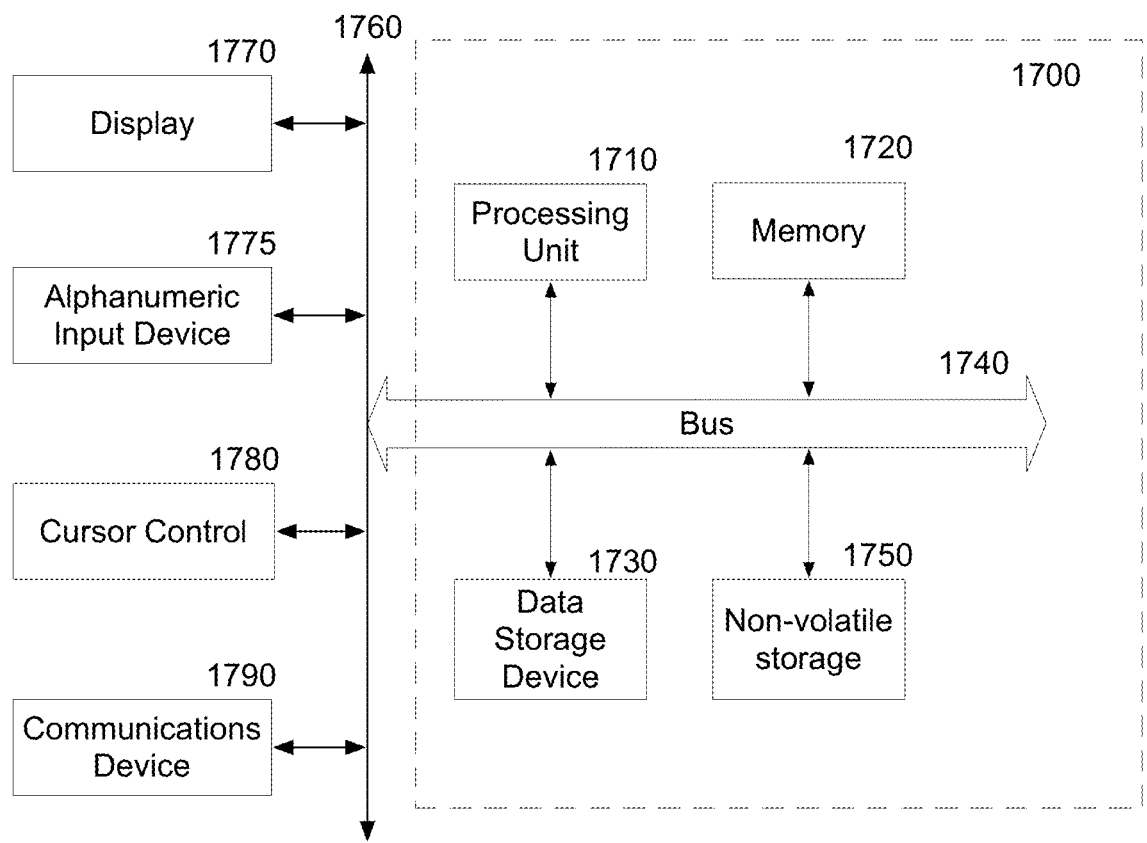
FIG. 17 is a block diagram of one embodiment of a computer system that may be used with the task assistant.

FIG. 17 is a block diagram of a particular machine that may be used with the task assistant described. It will be apparent to those of ordinary skill in the art, however that other alternative systems of various system architectures may also be used.

The data processing system illustrated in FIG. 17 includes a bus or other internal communication means 1740 for communicating information, and a processing unit 1710 coupled to the bus 1740 for processing information. The processing unit 1710 may be a central processing unit (CPU), a digital signal processor (DSP), or another type of processing unit 1710.

The system further includes, in one embodiment, a random access memory (RAM) or other volatile storage device 1720 (referred to as memory), coupled to bus 1740 for storing information and instructions to be executed by processor 1710. Main memory 1720 may also be used for storing temporary variables or other intermediate information during execution of instructions by processing unit 1710.

The system also comprises in one embodiment a read only memory (ROM) 1750 and/or static storage device 1750 coupled to bus 1740 for storing static information and instructions for processor 1710. In one embodiment the system also includes a data storage device 1730 such as a magnetic disk or optical disk and its corresponding disk drive, or Flash memory or other storage which is capable of storing data when no power is supplied to the system. Data storage device 1730 in one embodiment is coupled to bus 1740 for storing information and instructions.

The system may further be coupled to an output device 1770, such as a cathode ray tube (CRT) or a liquid crystal display (LCD) coupled to bus 1740 through bus 1760 for outputting information. The output device 1770 may be a visual output device, an audio output device, and/or tactile output device (e.g. vibrations, etc.)

An input device 1775 may be coupled to the bus 1760. The input device 1775 may be an alphanumeric input device, such as a keyboard including alphanumeric and other keys, for enabling a user to communicate information and command selections to processing unit 1710. An additional user input device 1780 may further be included. One such user input device 1780 is cursor control device 1780, such as a mouse, a trackball, stylus, cursor direction keys, or touch screen, may be coupled to bus 1740 through bus 1760 for communicating direction information and command selections to processing unit 1710, and for controlling movement on display device 1770.

Another device, which may optionally be coupled to computer system 1700, is a network device 1785 for accessing other nodes of a distributed system via a network. The communication device 1785 may include any of a number of commercially available networking peripheral devices such as those used for coupling to an Ethernet, token ring, Internet, or wide area network, personal area network, wireless network or other method of accessing other devices. The communication device 1785 may further be a null-modem connection, or any other mechanism that provides connectivity between the computer system 1700 and the outside world.

Note that any or all of the components of this system illustrated in FIG. 17 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 1720, mass storage device 1730, or other storage medium locally or remotely accessible to processor 1710.

It will be apparent to those of ordinary skill in the art that the system, method, and process described herein can be implemented as software stored in main memory 1720 or read only memory 1750 and executed by processor 1710. This control logic or software may also be resident on an article of manufacture comprising a computer readable medium having computer readable program code embodied therein and being readable by the mass storage device 1730 and for causing the processor 1710 to operate in accordance with the methods and teachings herein.

The present invention may also be embodied in a handheld or portable device containing a subset of the computer hardware components described above. For example, the handheld device may be configured to contain only the bus 1715, the processor 1710, and memory 1750 and/or 1725.

The handheld device may be configured to include a set of buttons or input signaling components with which a user may select from a set of available options. These could be considered input device #1 1775 or input device #2 1780. The handheld device may also be configured to include an output device 1770 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a kiosk or a vehicle. For example, the appliance may include a processing unit 1710, a data storage device 1730, a bus 1740, and memory 1720, and no input/output mechanisms, or only rudimentary communications mechanisms, such as a small touchscreen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 1785.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 1710. A machine-readable medium includes any mechanism for storing information in a form readable by a machine (e.g. a computer). For example, a machine-readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.)

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method comprising:
   determining, by at least one processor of a computing device, that a user of the computing device has logged into an account by verifying a voice biometric and a password entered by the user;
   determining, by the least one processor of the computing device, that a disputed transaction has resulted in a hold on the account;
   displaying, by the at least one processor, a verification screen indicating the hold on the account;
   receiving an input, by the at least one processor, comprising an indication that the user has selected to remove the hold on the account;
   prompting, by the at least one processor, the user to enter a biometric authentication to remove the hold on the account;
   outputting instructions, by the at least one processor, to prompt the user to perform a discrimination task comprising a physical interaction with the computing device and to provide a spoken response to the instructions; and
   responsive to verifying the biometric authentication and verifying that the discrimination task was completed, removing, by the at least one processor, the hold on the account.

2. The method of claim 1, wherein the biometric authentication comprises voice input.

3. The method of claim 1, wherein removing the hold on the account comprises transmitting an unblock request to a governing institution holding the account.

4. The method of claim 1, wherein the physical interaction with the computing device and the spoken response to the instructions comprise a non-recordable response from the user.

5. The method of claim 1, wherein outputting instructions to prompt the user to perform the discrimination task comprises utilizing multimodal output to output the instructions.

6. An apparatus comprising:
   at least one processor; and
   at least one memory storing computer-readable instructions that, when executed by the at least one processor, cause the apparatus to:
   determine that a user of the apparatus has logged into an account by verifying a voice biometric and a password entered by the user;
   determine that a disputed transaction has resulted in a hold on the account;
   display a verification screen indicating the hold on the account;
   receive an input comprising an indication that the user has selected to approve the disputed transaction that caused the hold on the account;
   prompt the user to enter a biometric authentication to approve the disputed transaction;
   output instructions to prompt the user to perform a discrimination task comprising a physical interaction with the apparatus and to provide a spoken response to the instructions; and
   responsive to verifying the biometric authentication from the user and verifying that the discrimination task was completed, remove the hold on the account.

7. The apparatus of claim 6, wherein the biometric authentication comprises voice input.

8. The apparatus of claim 6, wherein the instructions that cause the apparatus to remove the hold on the account comprise instructions that cause the apparatus to transmit an unblock request to a governing institution holding the account.

9. The apparatus of claim 6, wherein the physical interaction with the apparatus and the spoken response to the instructions comprise a non-recordable biometric response from the user.

10. The apparatus of claim 6, wherein the instructions that cause the apparatus to output the instructions to prompt the user to perform the discrimination task comprise instructions that cause the apparatus to utilize multi modal output to output the instructions.

11. A method comprising:
    determining, by at least one processor of a computing device, that a user of the computing device has logged into an account through a multi modal task assistant by verifying a voice biometric and a password entered by the user;
    receiving, by the at least one processor, a request from the user to put a hold on the account;
    prompting, by the at least one processor, the user to enter a voice biometric authentication within the multi modal task assistant to confirm the hold on the account;
    outputting instructions, by the at least one processor, to prompt the user to perform a discrimination task comprising a physical interaction with the computing device and to provide a spoken response to the instructions; and
    applying, by the at least one processor, the hold on the account upon receiving and validating the voice biometric authentication and verifying that the discrimination task was completed.

12. The method of claim 11, wherein the hold applies to one or more of: a transaction, the account, a card associated with the account, the computing device.

13. The method of claim 11, wherein
    the discrimination task is designed to request a non-recordable biometric response from the user to secure the computing device against replay attacks.

14. The method of claim 11, wherein outputting instructions to prompt the user to perform the discrimination task comprises utilizing multimodal output to determine that the user has physical control of the computing device.

15. The method of claim 1, wherein the verification screen comprises a description of the disputed transaction.

16. The method of claim 1, wherein removing the hold on the account comprises unblocking a credit card affiliated with the account.

17. The method of claim 1, wherein outputting the instructions to prompt the user to perform the discrimination task comprises outputting instructions that prompt the user to draw a shape.

18. The method of claim 1, wherein outputting the instructions to prompt the user to perform the discrimination task comprises outputting instructions that prompt the user to say a displayed word.

19. The method of claim 1, wherein the discrimination task is designed to detect that the biometric authentication is being entered by a live user.

20. The method of claim 1, wherein the discrimination task is designed to detect that the biometric authentication is not being replayed.

* * * * *